US007160602B2

(12) United States Patent
Tamagawa

(10) Patent No.: US 7,160,602 B2
(45) Date of Patent: Jan. 9, 2007

(54) IMAGE RECORDING MATERIAL, SUPPORT FOR THE IMAGE RECORDING MATERIAL AND PROCESS OF MANUFACTURING THE SUPPORT

(75) Inventor: Shigehisa Tamagawa, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 179 days.

(21) Appl. No.: 10/809,472

(22) Filed: Mar. 26, 2004

(65) Prior Publication Data

US 2004/0265513 A1 Dec. 30, 2004

(30) Foreign Application Priority Data

Jun. 25, 2003 (JP) .............................. 2003-181411

(51) Int. Cl.
*B32B 3/00* (2006.01)

(52) U.S. Cl. ...................... 428/195; 428/199; 428/211; 428/213; 428/537.5

(58) Field of Classification Search ................ 428/195, 428/199, 211, 213, 537.5
See application file for complete search history.

(56) References Cited

U.S. PATENT DOCUMENTS

| | | | | |
|---|---|---|---|---|
| 5,168,034 | A * | 12/1992 | Tamagawa et al. | 430/536 |
| 5,185,202 | A * | 2/1993 | Serizawa et al. | 428/335 |
| 5,362,614 | A * | 11/1994 | Serizawa et al. | 430/538 |
| 5,474,856 | A * | 12/1995 | Tamagawa et al. | 428/537.5 |
| 6,716,495 | B1 * | 4/2004 | Yoshino et al. | 428/32.16 |

FOREIGN PATENT DOCUMENTS

| | | |
|---|---|---|
| JP | 8-11424 | 1/1996 |
| JP | 2000-39736 | 2/2000 |

* cited by examiner

*Primary Examiner*—Leszek B. Kiliman
(74) *Attorney, Agent, or Firm*—Young & Thompson

(57) ABSTRACT

A support for an image recording material comprises base paper having a formation index at a restriction diameter of 1.0 mm equal to or greater than 80 and density equal to or greater than 0.95 $g/m^3$, changes of said formation index and density of said base paper before and after contact of a front surface of said base paper at a side on which an image recording layer of said imager recording material is formed with water at 20° C. for 30 seconds being equal to or less than 10 and 0.05 $g/m^3$, respectively.

24 Claims, 1 Drawing Sheet

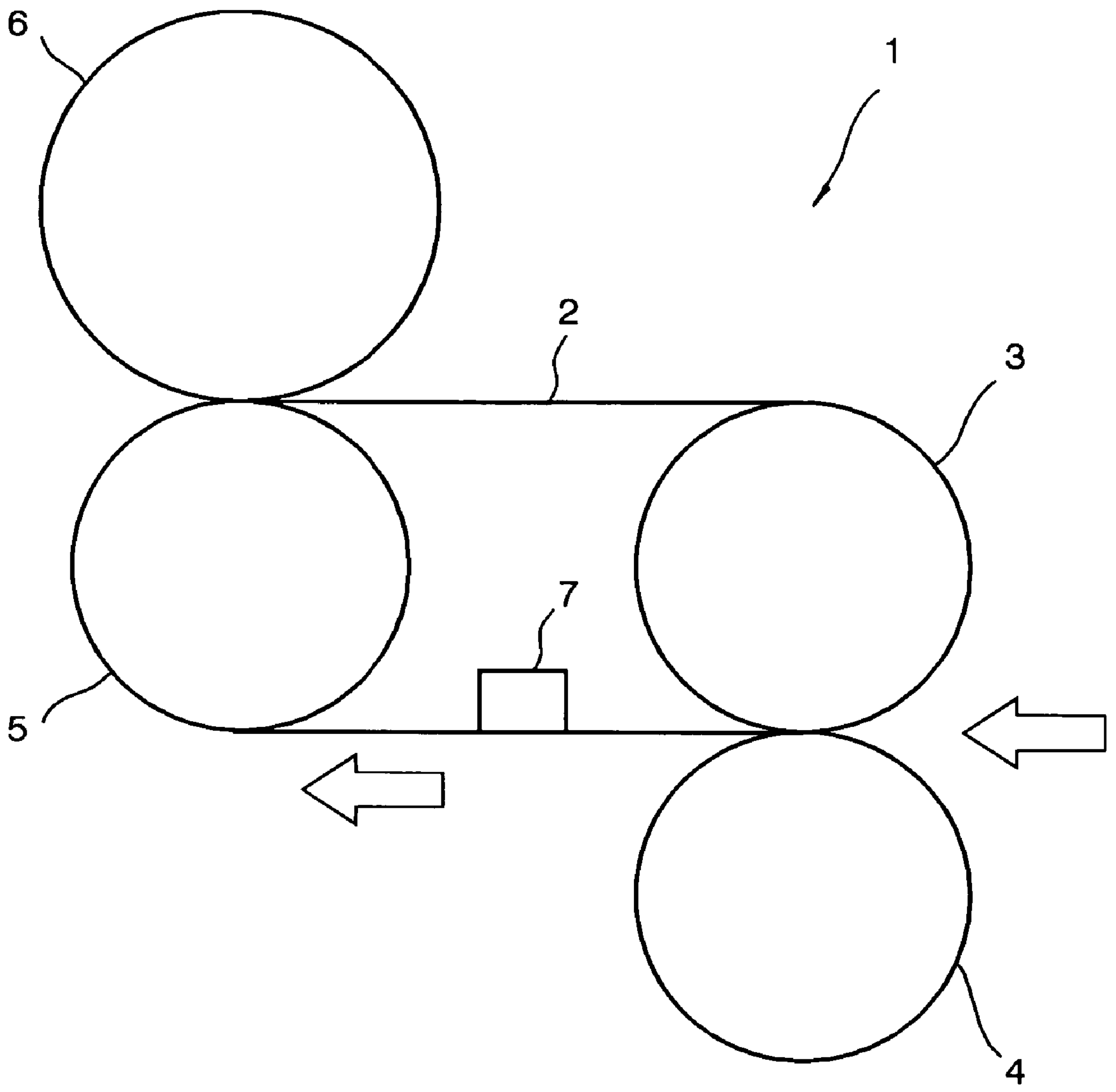
6
1
2
3
7
5
4

IMAGE RECORDING MATERIAL, SUPPORT FOR THE IMAGE RECORDING MATERIAL AND PROCESS OF MANUFACTURING THE SUPPORT

BACKGROUND OF THE INVENTION

1. Field of the Invention

The present invention relates to an image recording material that can provide an image nearly equal in quality to silver halide photographic images, a support for the image recording material, and a process of manufacturing the support.

2. Description of Related Art

Conventionally, in order to produce an image with high quality like silver halide photography, various efforts have been made to adjust density and an index of formation of a support of an image recording material, For example, ink jet printing paper disclosed in, for example, Japanese Unexamined Patent Publication No. 8(1996)-11424 is adjusted in density to from 0.80 to 0.90 g/m$^3$ and in formation index to 20 or higher in order to ameliorate mixed color bleeding and unevenness of color density of an image after printing. Further, electrophotographic image transfer material disclosed in, for example, Japanese Unexamined Patent Publication No. 2000-39736 is adjusted in density to a lower value and in formation index to 25 or higher in order to improve image quality and appearance of a printed matter and pass-though ability to pass though electrophotographic equipments.

These image recording materials adjusted in formation index must have higher density in order to improve planarity sufficiently enough and a sufficiently higher formation index in order to provide an image nearly equal in quality to silver halide photographic images. Therefore, the present situation is still far removed from an image recording material with an entirely satisfactory performance and a support for the material.

SUMMARY OF THE INVENTION

It is therefore an object of the present invention to provide for an image recording material, in the form of paper, that has excellent smoothness and provides an image nearly equal in quality to silver halide photographic images, a support for the image recording material, and a process of manufacturing the support.

According to one aspect of the present invention, the support comprises base paper that has a formation index at a restriction diameter of 1.0 mm equal to or greater than 80 and further, preferably, has density equal to or greater than 0.95 g/m$^3$. It is preferred that changes of the formation index and the density of the base paper before and after contact of a front surface of the base paper at a side on which an image recording layer of the imager recording material is formed with water at 20° C. for 30 seconds are equal to or less than 10 and equal to or less than 0.95 g/m$^3$, respectively.

The base paper may be coated or impregnated with at lease one of a water repellent agent, a sizing agent, a water-proofing agent and a finishing agent at the front surface. Further, the base paper may be coated with an aqueous polymer contained layer at least one of opposite surfaces thereof The base paper may be coated with a polyolefin resin layer at least one of opposite surfaces thereof.

According to another aspect of the present invention, the image recording material, suitably used as electrophotographic recording paper, heat-sensitive recording paper, ink jet printing paper, sublimation transfer recording paper, silver halide photographic paper or thermal transfer recording paper, comprises the support that comprises base paper having at least a formation index at a restriction diameter of 1.0 mm equal to or greater than 80 and, preferably density equal to or greater than 0.95 g/m$^3$ and an image forming layer formed on the support.

It is preferred to make the base paper with a paper machine, preferably a Fourdrinier paper machine, equipped with a shake having a swing of 10 mm or greater, equipped with a dandy roller having a wire in a range of from 40 to 100 mesh or equipped with a calender having a metal roller at a surface temperature of 140° C. or higher.

According to the photographic image recording material, the base paper has a formation index at a restriction diameter of 1.0 mm equal to or greater than 80. It is preferred that the base paper shows a change of the formation index before and after contact of the front surface with water at 20° C. for 30 seconds equal to or less than 10. The photographic image recording material comprising the support made of the base paper has excellent smoothness and provides an image of substantially the same quality as silver halide photographic images.

According to the process of manufacturing the imager recording material of the present invention, the base paper is subjected to processing selected from shaking with a shake having a swing of 10 mm or greater, dandy rolling with a dandy roller having a wire in a range of from 40 to 100 mesh and calendering with a calender having a metal roller at a surface temperature of 140° C. or higher. The photographic image recording material comprising the support made of the base paper subjected to the processing has excellent smoothness and provides an image of substantially the same quality as silver halide photographic images.

The photographic image recording material having excellent smoothness and providing an image of substantially the same quality as silver halide photographic images is suitably used as electrophotographic recording paper, heat-sensitive recording paper, ink jet printing paper, sublimation transfer recording paper, silver halide photographic paper or thermal transfer recording paper.

BRIEF DESCRIPTION OF THE DRAWINGS

The foregoing and other objects and features of the present invention will be clearly understood from the following detailed description when read with reference to the accompanying drawings, in which the single FIGURE is a schematic view of a belt fixing device incorporated in a printer for forming an image on an image recording material of the present invention.

DETAILED DESCRIPTION OF THE PREFERRED EMBODIMENTS

A support of an image recording material of the present invention comprises at least base paper and, as appropriate, other layers. The base paper has need to have a formation index of 80 or higher, preferably 100 or higher, at a restriction diameter of 1.0 mm. The upper bound of the formation index is, but not limited to, preferably less than 120. If the formation index is less than 80, the support is too poor in smoothness to provide an image nearly equal in quality to silver halide photographic images. It is preferred for the support to show a change in formation index less than 10, more preferably less than 7, after contact with water at 20° C. for 30 seconds with respect to before the contact. If the change in formation index exceeds 10, the support possibly shows poor planarity. The formation index is represented by an average formation index of three pieces of base paper. The formation index indicates that base paper has formation becoming better with an increase in formation index. A greater formation index of a paper is indicative of a narrow mass distribution of the paper which the base paper is uniform.

In this instance, the formation index can be measured by an instrument well known in the art such as, for example, a 3-D sheet analyzer such as manufactured by M/K Systems Corporation under the following conditions:

| | |
|---|---|
| Measuring range: | 10 cm × 10 cm |
| Measuring points: | 65536 points |
| Restriction diameter: | 1.0 mm |

In the case of using a restriction having a diameter of 0.5 mm, the formation index is preferably greater than 50 and more preferably greater than 80.

More specifically, the 3-D sheet analyzer comprises a rotary drum to which a sample piece of base paper is attached, a light source disposed in the rotary drum and a photodetector with a restriction disposed outside the rotary drum. A difference in local light intensity of the sample piece of base paper attached to a rotary drum is detected as a difference in local base weight by the photodetector. The extent of measurement is defined by a diameter of the restriction in front of the photodetector. An output representative of the light intensity difference is converted from an analogue to digital signal and classified into 64 optical level zones so as to sample 65,536 data every scan. A histogram of the 65,536 data is made with respect to the 64 optical level zones. The formation index is indicated as a percentage figure of the quotient obtained by dividing the greatest frequency (peak frequency) by the number of level zones showing a frequency of 100 or greater.

The base paper for the support of the image recording paper preferably has a density equal to or higher than 0.95 $g/m^3$ and more preferably equal to or higher than 1.00 $g/m^3$. If the base paper density is lower than 0.95 $g/m^3$, the support is possibly poorly improved in smoothness. The support furthermore preferably has a change in density less than 0.05 $g/m^3$ after contact with water at 20° C. for 30 seconds with respect to before the contact. If the change in density exceeds 0.05 $g/m^3$, the support possibly shows poor planarity.

It is preferred to make the base paper by use of a paper machine having a shake with a swing of 10 mm or greater, and more preferably with a swing of 15 mm or grater, in order to provide the support with improved smoothness and to enable high quality image formation. Otherwise, it is preferred to make the base paper by use of a paper machine having a dandy roller with a wire mesh of from 40 to 100 mesh in order to provide the support with improved smoothness and to enable high quality image formation. In addition, it is preferred to make the base paper from pulp of fibers having a weight-average fiber length in a range of from 0.45 to 0.65 mm by use of a paper machine with a calender equipped with a metal roller at a surface temperature of 140° C. in order to provide the support with improved smoothness and to enable high quality image formation. It is furthermore preferred to apply a jet-wire ratio J/W which refers to a ratio of a slurry jet velocity relative to a wire velocity in a range of from 0.9 to 1.0, and more preferably in a range of from 0.95 to 1.05, to a paper making process using a Fourdrinier paper machine in order to provide the support with improved smoothness and to enable high quality image formation. It is also preferred to shake pulp by use of a paper machine having a shake with a swing of 10 mm or greater in that paper making process. Furthermore, it is preferred to use a paper machine having a dandy roller with a wire mesh of at from 40 to 100 mesh in a later half stage of a paper making process.

Preferred examples of the base paper include, but not limited to, bond paper and paper enumerated in "Fundamentals of Photographic Engineering-Silver Halide Photography-" pages 223–240, edited by Japanese Society of Photograph (published 1979 by Corona Co., Ltd.). Raw materials available for the base paper include, but not limited to, bleached broad leaf tree kraft pulp (LBKP) in light of improving surface smoothness, stiffness and dimensional stability (curling property) all together to a sufficient and balanced level. It is allowed to use bleached coniferous tree kaft pulp (NBKP) or broad leaf tree sulphite pulp (LBSP) as a row material for the base paper. It is appropriate to use broad leaf tree pulp that has a shorter fiber length by nature. A beater or a refiner can be used to beat the pulp.

It is preferred that the base paper has a freeness in a range of from 200 to 440 ml, and more preferably in a range of from 250 to 380 ml, in Canadian Standard Freeness (C.S.F.).

A pulp slurry attained by beating is added, if needed, various additives, e.g. a loading material, a dry paper strength fortifier, a sizing agent, a wet paper strength fortifier, a fixing agent, a pH adjuster and other chemical conditioners or agents.

Preferable examples of the loading material include calcium carbonate, clay, kaolin, a white earth, talc, a titanium oxide, a diatom earth, barium sulfate, an aluminum hydroxide, a magnesium hydroxide, etc.

Preferable examples of the dry paper strength fortifier include cationic starch, cationic polyacrylamide, anionic polyacrylamide, amphoteric polyacrylamide, carboxy-modified polyvinyl alcohol, etc.

Preferable examples of the sizing agent include a fatty acid salt, rosin, a rosin derivative such as maleic resin, paraffin wax, an alkylketene dimer, an alkenyl anhydrate succinic acid (ASA), compounds higher fatty acid such as an epoxidized fatty acid amide, etc.

Preferable examples of the wet paper strength fortifier include polyanine polyamide epichlorohydrin, a melamine resin, a urea resin, an epoxidized polyamide resin, etc.

Preferable examples of the fixing agent include a polyvalent metal salt such as aluminum sulfate or aluminum chloride, a cationic polymer such as cationic starch, etc.

Preferable examples of the pH adjuster include caustic soda, sodium carbonate, etc.

Preferred examples of the chemical conditioner that may be added to the pulp slurry include a deforming agent, dye, a slime controlling agent, fluorescent brightening agent, etc. In addition, it is allowed to add, if necessary, a softening agent such as described in "New Handbook For Paper Processing" pages 554 and 555 (1980 Edition by Paper Chemicals Times).

A sizing solution for use with the surface sizing may contain a water-soluble high molecular compound, a water resistant material, pigment, dye, etc.

Preferable examples of the water-soluble high molecular compound include, but not limited to, cationic starch, polyvinyl alcohol, carboxy-modified polyvinyl alcohol, carboxymethyl cellulose, hydroxyethyl cellulose, cellulose sulfate, gelatin, casein, sodium polyacrylate, a sodium salt of styrene-maleic anhydrate copolymer, polystyrene sodium sulfonate sodium, etc.

Preferred examples of the water resistant material include calcium carbonate, clay, kaolin, talc, barium sulfate, a titanium oxide, etc.

When the base paper is used for an electrophotographic image recording paper, it is preferred that the base paper has a Young's modulus ratio of longitudinal Young's modulus (Ea) relative to transversal Young's modulus (Eb) is in a range of from 1.5 to 2.0. If the Young's modulus ratio (Ea/Eb) is out of the range, i.e. less than 1.5 or greater than 2.0, the electrophotographic image recording paper is apt to become poor in stiffness and curling property and, in consequence, to incur aggravation of traveling property.

It has been known that "stiffness" of paper is different depending upon beating manners. Elastic force (elasticity) of paper made after beating can be employed as one of key factors representing the "stiffness" of paper. In particular, the elasticity of paper can be find by using the relationship between the dynamic modulus of elasticity representing a solid state property of paper as a visco-elastic body and the density of paper and measuring the acoustic propagation velocity through paper by an ultrasonic transducer and is expressed by the following equation.

$$E=\rho c^2(1-n^2)$$

where E is the dynamic elastic coefficient;

ρ is the paper density;

c is the acoustic propagation velocity through paper n is Poisson's ratio.

Because Poisson's ratio n of ordinary paper is approximately 0.2 at the most, the dynamic modulus of elasticity can be approximated by the following equation.

$$E=\rho c^2$$

That is, the modulus of elasticity is easily obtained in the event where the density of paper and the acoustic propagation velocity of paper. An acoustic propagation velocity of paper can be measured by an instrument well known in the art such as, for example, Sonic Tester SST-110 (which is manufactured by Nomura Co., Ltd.).

In order to create desired average surface roughness on a paper surface, it is preferred to use pulp fibers having fiber length distributed as disclosed in, for example, Japanese Unexamined Patent Publication No.58-68037. Specifically, according to the distribution of fiber length, the pulp fibers contain a total part of residual pulp fibers screened with a 24-mesh screen and residual pulp fibers screened with a 42-mesh screen in a range of from 20 to 45% by mass and a part of residual pulp fibers screened with 24-mesh screen of less than 5% by mass. The base paper can be adjusted in average surface roughness by applying heat and pressure for surface treatment using a machine calender or a super calender.

The base paper preferably has a thickness in, but not limited to, a range of from 30 to 500 μm, more preferably in a range of from 50 to 300 μm, and most preferably in a range of from 100 to 250 μm. The base paper also preferably has a basic weight in a range of from 50 to 250 $g/m^2$ and more preferably in a range of from 100 to 200 $g/m^2$.

Highly glossy base paper can be prepared by processing a front surface at a side on which an image recording layer is formed on the support by high temperature soft calendering. For example, the base paper processed by a metallic calender roller at a high surface temperature has a glossy surface showing a degree of glossiness higher than 25%. The surface temperature of the metallic calender roller is preferably, but not limited to, 140° C., more preferably 200° C., and most preferably 250° C. The degree of glossiness of a base paper subjected to conventional calendering that is performed at a metallic roller surface temperature around 90 ° C., which is comparatively low, is no more than 12%.

The calendering using a metallic surface is performed by the use of a pair of rollers at least one of which is made of metal. This type of calendering may be performed by a soft calender machine having a combination of a metallic roller and a synthetic resin roller or a calender machine having a pair of metallic rollers. Among them, the soft calender machine is preferred in light of a wide nip of from 50 to 270 mm between the metallic roller and a shoe roller so as thereby to increase a contact area of base paper with the calender rollers. These calendering may be applied independently or in combination. The nip pressure for the calendaring is preferably higher than 100 kN/m and more preferably in a range of from 100 to 600 kN/m.

It is preferred to coat or impregnate a surface of the base paper on which an image forming layer is formed with at least one of a water repellent agent, a sizing agent, a water-proofing agent and a finishing agent. Preferred examples of the water repellent agent include a silicon compound, modified silicon, hardened silicon, carbon wax, etc.

Preferable examples of the sizing agent include a fatty acid salt, rosin, a rosin derivative such as maleic rosin, paraffin wax, an alkylketene dimer, an alkenyl anhydrate succinic acid (ASA), compounds higher fatty acid such as epoxidized fatty acid amide, etc. Among them, alkylketene dimer or epoxidized fatty acid amine is especially preferable. The content of sizing agent is preferably, but not limited to, 0.3% by mass, and more preferably 0.5% by mass with respect to the mass of base paper pulp.

Preferred examples of the water-proofing agent include latex or emulsion of a styrene-butadiene copolymer, an ethylene-vinyl acetate copolymer, polyethylene, a vinylidene chloride copolymer, etc., and polyamide polyamine epichlorohydrin and the like.

Preferred examples of means for coating or impregnating the surface of the base paper with a water repellent agent, a sizing agent and/or a water-proofing agent include, but not limited to a horizontal sizing press, a sizing bath, a gate roller coater, a film transfer coater, a rod coater, a billblade coater, a spray coater, an air knife coater, a curtain coater, etc. Among them, the gate roller coater or the curtain coater is especially preferable.

Support Coated with Aqueous Polymer

Preferred examples of the aqueous polymer include, but not limited to, emulsion and latex. Preferred examples of the emulsion include hydrocarbon latex such as paraffin was, microcrystalline wax, etc.; oxygen containing wax such as carnauba wax, montan wax oxide paraffin, etc.; hydrocarbon resins such as petroleum resins, coumarone-indene resins, terpene resins, carboxylic acid addition products of these resins, etc.; an emulsion of polyolefin such as ethylene and polypropylene, acryl, acrylic styrene, polyester; or an emulsion of alkylketene dimmer, epoxidized fatty acid amid, etc. Among them, a soap free emulsion is especially preferable.

Preferred examples of the soap free emulsion include acrylic soap free emulsion such as an acrylic ester homopolymer and a copolymer of acrylic ester polymerized to methacrylic ester, vinyl acetate, styrene, acrylic nitrile or acrylic acid, and polyolefin soap free emulsion such as ethylene-vinyl acetate copolymer emulsion, ethylene-acrylic copolymer, ionomer and the like.

Preferred aqueous solvent is water or water added with a water-soluble organic solvent. Preferred examples of the water-soluble organic solvent include ethylene glycol, propylene glycol, butylene glycol, diethylene glycol, triethylene glycol, polyethylene glycol (average molecular weight: approximately 190~400), glycerin, alkyl ether of these glycol, N-methyl pyrrolidone, 1,3-dimethyl imidazolidine, thiodiglycol, 2-pyrrolidone, sulfolane, dimethyl sufoxide, diethanol amine, triethanol amine, ethanol, isopropanol, etc. A coating fluid of the soap free emulsion may be added with various additives such as a matting agent, pigment, plastisizing agent, a releasing agent, a lubricating agent, a viscosity fortifier, an antistatic agent, a fluorescent brightening agent, a tinge adjusting dye, etc., as appropriate. Preferred examples of the latex include styrene•butadiene•rubber (SBR), MBR, PVdc, etc. Among them, soap free latex is preferable. Preferable examples of the soap free latex include core-shell type latex particles prepared by an emulsification polymerization process without using an emulsifier (surface-active substance) such as disclosed in "Synthesis•design and development of New Application of Acrylic Resin" (Chubu Management And Development Center,), pages 279~281.

Processes of producing the soap free latex include a seed process, a reactive emulsifier process, and an oligomerization process.

The seed process is a process of polymerizing a water dispersive polymer as a seed polymer added with monomer. By ordinary, the seed polymer forms a core and then the polymerized polymer forms a shell with progress of polymerization of the monomer, so as thereby to develop a core-shell structure.

The reactive emulsifier process is a process which uses a compound (reactive emulsifier) having an ethylenic unsaturated linkage and an anionic hydrophilic group or an nonionic hydrophilic group in one molecule in the same way as a conventional emulsifier. In this instance, the reactive emulsifier is entrapped within the polymerized product. There are various reactive emulsifiers known in the art such as acrylic acid derivatives disclosed in Japanese Unexamined Patent Publication Nos. 55(1980)-11252 and 56(1981)-28208, itaconic acid derivatives disclosed in Japanese Unexamined Patent Publication No. 51(1976)-30284, maleic acid derivatives disclosed in Japanese Unexamnined Patent Publication No. 51(1976)-30284 and Japanese Patent Publication No. 56(1981)-29657, furmaric acid derivatives disclosed in Japanese Unexamined Patent Publication Nos. 51(1976)-30285 and 51(1976)-30284, etc.

More specifically, one of the seed polymers that is suitably used for producing the core-shell type latex resin composition is prepared by an emulsification polymerization process, a suspension polymerization process or a dispersion polymerization process. Even though an emulsifier is used in the emulsification polymerization process, it is possible to reduce the emulsifier in quantity through separation and purification processes. If the emulsifier remains somewhat contained in the seed polymer, the seed polymer is entrapped within the core-shell structure and not present on the periphery of the core-shell structure, so as to be hardly affected by moisture. A seed polymer prepared by the suspension polymerization process or the dispersion polymerization process needs to undergo a troublesome process for separating out a dispersant and a solvent. The seed polymer that is preferably used is a water soluble higher polymer such as a polyacrylic salt, a copolymer of polyacrylic salt, gelatin, tragacanth rubber, starch, methyl cellulose, hydroxyethyl cellulose, carboxymethyl cellulose, polyvinyl alcohol or polyvinyl pyrrolidone. Various ethylenic unsaturated monomers are available as the monomer that is added under existence of the seed polymer in the seed process as long as they are radical polymerizable. In this instance, the monomer may or may not be the same as the monomer used in preparing the seed polymer.

Preferred examples of the monomer include (meth)acrylic ester monomers, monovinyl aromatic monomers, (meth) vinyl ester monomers, vinyl ether monomers, monoolefin monomers, diolefin monomers, olefin halide monomers, polyvinyl monomers, etc.

Examples of the (meth)acrylic ester monomer include (meth)acrylic acid, (meth) methyl acrylate, (meth)ethyl acrylate, (meth)butyl acrylate, (meth)acrylic acid 2-ethylhexyl, (meth)cyclohexyl acrylate, (meth)phenyl acrylate, β-hydroxyethyl acrylate, γ-aminopropyl acrylate, methacrylate ester, dimethylaminoethyl methacrylate, diethylaminoethyl methacrylate, and compounds of them.

Examples of the vinyl aromatic monomer are styrene monomers such as include styrene, o-methyl styrene, m-methyl styrene, p-methyl styrene, p-methoxy styrene, p-phenyl styrene, p-chlorostyrene, p-ethyl styrene, p-butyl styrene, p-t-butyl styrene, p-hexyl styrene, p-octyl styrene, p-nonyl styrene, p-decyl styrene, p-dodecyl styrene, 2,4-dimethyl styrene, 3,4-diclo styrene, etc, derivatives of them and compounds of them.

Examples of the vinyl ester monomer include vinyl acetate, vinyl propionate, vinyl benzoate, etc.

Examples of the vinyl ether monomer include vinyl methyl ether, vinyl ethyl ether, vinyl isobutyl ether, vinyl phenyl ether, etc.

Examples of the olefin monomer include monoolefin monomers such as ethylene, propylene, isobutylene, 1-butene, 1-pentene, 4-methyl-1-pentene, etc. and diolefin monomers such as butadiene, isoprene, chloroprene, etc.

Furthermore, a cross-linkable monomer may be added in order to improve characteristics of the seed polymer. Examples of the cross-linking monomer include a monomer having more than two unsaturated bonds such as divinyl benzene, divinyl naphthalene, divinyl ether, diethylene glycol methacrylate, ethylene glycol dimethacrylate, polyethylene glycol dimethacrylate, diallyl phthalate, etc.

In the seed process, a radical polymerization initiator may be used when it is water-soluble. Examples of the radical polymerization initiator include persulfate salts, such as potassium persulfate, ammoniun persulfate, etc.; azo compounds such as 4,4'-azobis 4-cyano varelic acid, a salt of 4,4'-azobis 4-cyano varelic acid, a salt of 2,2'-azobis (2-amidinopropan), etc.; and peroxides.

The polymerization initiator may be used as a redox type initiator in combination with a reductant as appropriate. The use of such a redox type initiator enhances polymerization activity, lowers polymerization temperature, and shortens polymerization time. The polymerization temperature is preferably in a range of from 50 to 80° C. by ordinary, but not bounded as long as it is higher than the lowest temperature for radical formation of the polymerization initiator. In the case where the polymerization initiator causes polymerization at an ordinary temperature, the polymerization initiator is made possible to cause polymerization at a room temperature or a temperature lower than a room temperature by utilizing a combination of hydrogen peroxide and reductant (such as ascorbic acid).

The core-shell particle is such that the number average molecular weight of shell [Mn(c)] is preferably in a range of from 30000 to 500000 and more preferably in a of from 40000 to 400000 and the number average molecular weight of shell [Mn(s)] is preferably in a range of from 4000 to 30000 and more preferably in a range of from 5000 to 20000. The mass ratio of core relative to shell is preferably in a range of from 10:90 to 90:10 and more preferably in a range of from 20:80 to 80:20. If the mass ratio is out of the range, the core-shell structure is difficult to exploit its characteristic and has a characteristic similar to a simple continuous film. The average size of core-shell particles is preferably smaller than 0.2 μm and more preferably 0.1 μm. The lower limit of average size of core-shell particles is approximately 0.04μm. If the average size of core shell-particles exceeds 0.2μm, it is difficult to bring the characteristic of the core-shell structure into play.

The coating liquid of soap free latex may be added with, for example, a matting agent, a pigment, a plastisizing agent, a lubricating agent, a viscosity fortifier, an antistatic agent, a fluorescent brightening agent, a tinge adjusting dye, etc., as appropriate.

The glass-transition temperature (Tg) of a resin of the soap free latex or the soap free emulsion is desirably higher than 30° C. and more preferably higher than 50° C. The soap free latex or the soap free emulsion has the solid content or spread with respect to the base paper preferably in a range of from 0.5 g/$m^2$ to 10 g/$m^2$ and more preferably in a range of from 1 to 5 g/$m^2$.

-Support Coated with Polymer-

It is preferred that the support for the electrophotographic image recording paper is coated with a polymer layer on one side or on opposite sides of the support in light of smoothness and improved image quality. The polymer is preferably, but not bounded to, polyolefin resins. Preferred examples of the polyolefin resin include a resin of α-olefin homopolymer such as polyethylene, polypropylene, etc. and a resin of a mixture of polyethylene, polypropylene, etc. The molecular weight of these polyolefin resins are ordinarily preferable in, but not limited to, a range of from 20,000 to 200,000 as long as they are suitable for extrusion coating.

Preferable examples of the polyethylene resin includes, high density polyethylene (HDPE), lower density polyethylene (LDPE), linear lower density polyethylene (L-LDPE), etc. For example, in light of uniform and neat cut section of a support when cutting the support to a specified size of sheet with a cutter in a cutting process, it is preferred to use a polyethylene resin having a melt index of from 5 to 30 g/10 min. It is more preferred to use a polyethylene resin mixture of 40 to 75 parts by mass of higher density polyethylene having a melt index of from 10 to 20 g/10 min and a density of higher than 0.945 g/$m^3$ and 25 to 60 parts by mass of lower density polyethylene having a melt index of from 1 to 15 g/10 min, preferably from 2 to 10 g/10 min and a density of less than 0.930 g/$m^3$. These resins may be used independently or in a mixture of two or more of them. The mixture ratio by mass of higher density polyethylene and lower density polyethylene (HDPE/LDPE) is preferably between 40/60 and 75/25 and more preferably between 50/50 and 70/30. It is not improbable that the support does not have a desired cut feature (uniform cut section) in a cutting process when it is coated with a polyolefin resin layer of a mixture of more than 75 parts by mass of higher density polyethylene and less than 25 parts by mass of lower density polyethylene coated thereon. On the other hand, although the support has a desired cut feature in a cutting process when it is coated with a polyolefin resin layer of a mixture of less than 40 parts by mass of higher density polyethylene and more than 60 parts by mass of lower density polyethylene coated thereon, the support is undesirable because the paper surfaces are possibly locally melted by heating rollers in a fixing process, this leads to an occurrence of jamming due to aggravation of surface quality or defective traveling property. In the case where the support is coated with polyolefin resin layer on opposite sides, it is preferred to apply the mixture composition to both polyolefin resin layers. The polyolefin resin layer may be added with a surface active agent and/or an antistatic agent such as a metal oxide or the like in order to adjust surface electric resistance and, further, may be used to double as a conductive layer containing these additives.

In light of providing a high quality image, the polyolefin resin layer when the support is coated with a single layer or at least one of the polyolefin resin layer when the support is coated with multiple layers may contain an inorganic pigment such as a titanium dioxide, a bluing agent, a fluorescent brightening agent, an antioxidant, etc. therein. Among them, it is particularly preferred for the polyolefin resin layer to contain a titanium dioxide. Further, in light of satisfactory adhesion properties to the base paper, when the support is coated with multiple layers, the bottom polyolefin resin layer in contact with the base paper may contain adhesion imparting resin, an adhesive resin, etc. therein. The polyolefin resin layer may further contain an antioxidant, a releasing agent, or a hollow polymer.

When letting the polyolefin resin layer contain titanium dioxides, the titanium dioxide may take, but not limited to, an anatase type or a rutile type. Strictly, the anatase type of titanium dioxide is preferred in the case of giving priority to whiteness and the rutile type of titanium dioxide is preferred in the case of giving priority to sharpness. Both types of titanium dioxides may be blended in the case of regarding both whiteness and sharpness. It is also allowed to use two polyolefin resin layers, one containing the anatase type of titanium dioxide and the other containing the rutile type of titanium dioxide.

The mean particle size of titanium dioxide particles is preferably in a range of from 0.1 to 0.4 μm. If the titanium oxide particles have a mean particle size less than 0.1 μm, it is hard to distribute the titanium oxide particles uniformly in the polyolefin resin layer. On the other hand, if the titanium oxide particles have a mean particle size beyond 0.4μm, they are not only impossible to provide satisfactory whiteness but also cause tiny projections on the surface of the polyolefin resin layer. This results in poor image quality. It is preferred to apply a surface treatment to the titanium oxide particles with a silane coupling agent that is preferably modified at the end group by ethoxy or methoxy. The amount of the silane coupling agent used for the surface treatment is preferably in a range of from 0.05 to 2.5% by mass, more preferably in a range of from 0.5 to 2.0% by mass, with respect to the amount of titanium dioxide, If the amount of the silane coupling agent is less than 0.05% by mass, the silane coupling agent possibly can not be effective in surface treatment. On the other hand, if the amount of the silane coupling agent is beyond 2.5% by mass, the silane coupling agent has an effect on the titanium dioxide somewhat to excess. In order to restrain activity of the inorganic pigment of titanium dioxide as an inorganic pigment, it is preferred to apply a surface treatment to the titanium dioxide particles with an inorganic surface treatment agent that is preferable to be at least one of $Al_2O_3$ and $SiO_2$. The amount of the inorganic surface treatment agent (in an anhydrate form) used for the surface treatment is preferably in a range of from 0.01 to 1.8% by mass, more preferably in a range of from 0.2 to 1.0% by mass, with respect to the amount of titanium dioxide, If the titanium dioxide particles are not treated with the inorganic surface treatment agent, they are low in heat resistance and, in consequence, possibly turn yellow when used for extruded lamination at a temperature of approximately 320° C. In addition, because of no restraint of activity, the titanium dioxide particles are apt to agglutinate with the consequence that they get stuck with a metal filter screen of 20 to 400 meshes that is installed near an extrusion port of an extrusion machine for the purpose of containing a spill of foreign materials and, as a result, cause a rise in extrusion pressure in the extrusion machine. On the other hand, if the amount of the inorganic surface treatment agent is beyond 0.05% by mass, the inorganic surface treatment agent is apt to be clouded with condensation. The inorganic surface treatment agent clouded with condensation possibly hastens development of dirt retention on die lips of the extrusion machine for lamination.

The titanium dioxide is mixed and kneaded in the polyolefin resin together with an auxiliary dispersing agent such as a metal salt of higher fatty acid, higher fatty acid ethyl, higher fatty acid amide, higher fatty acid, polyolefin wax, etc. by a kneading machine such as a two-roller kneader, a three-roller kneader, a Banbury type mixer, a continuous kneading machine, etc. An example of the auxiliary dispersing agent is preferably a metal salt of stearic acid, and more preferably zinc stearic acid. The polyolefin resin kneaded with the inorganic pigment, i.e. titanium dioxide, is molded in the form of pellet and used as a mater batch of inorganic pigment. The concentration of titanium dioxide of a pellet is preferably in a range of from approximately 30 to approximately 75% by mass. The concentration of an auxiliary dispersing agent of the pellet is preferably in a range of from approximately 0.5 to 10% by mass. If the concentration of titanium dioxide is less than approximately 30% by mass, the pellet becomes somewhat bulky. On the other hand, if the concentration of titanium dioxide exceeds approximately 75% by mass, the titanium dioxide particles show deterioration in dispersibility and make the pellets easily crack. The density of auxiliary dispersing agent of the pellet is preferably in a range of from 0.5 to 10% by mass. The master batch containing titanium dioxide is preferred to be dried at a temperature between 50 and 90° C. for longer than two hours with air drying or vacuum drying.

The titanium dioxide content of the polyolefin resin layer is preferably in a range of from 5 to 50% by mass and more preferably in a range of from 8 to 45% by mass. If the titanium dioxide content is less than 5% by mass, the electrophotographic image recording paper yields aggravation of resolution. On the other hand, if the titanium dioxide content exceeds 50% by mass, the polyolefin resin layer possibly develops die seams during formation.

Preferable examples of the bluing agent include an ultramarine blue pigment, a cobalt blue pigment, a phosphoric oxide cobalt blue pigment, a quinacridone pigment, etc. and mixtures of them. The particle size of bluing agent is preferably in, but not limited to, a range of from 0.3 to 10 μm by ordinary. In the case where the bluing agent is contained in a top layer of the multi-layered polyolefin resin layer, the content of bluing agent in the top layer is preferably in a range of from 0.2 to 0.4% by mass with respect to the mass of polyolefin resin of the top layer. On the other hand, in the case where the bluing agent is contained in a bottom layer of the multi-layered polyolefin resin layer, the content of bluing agent in the bottom layer is preferably in a range of from 0 to 0.15% by mass with respect to the mass of polyolefin resin of the bottom layer.

The antioxidant content of the polyolefin resin layer is preferably in a range of from 50 to 1000 ppm relative to the amount of the resin component. The mater batch containing the titanium dioxide pigment thus prepared is diluted with a resin forming a part of the polyolefin resin layer before extrusion lamination.

Preferable examples of the adhesion imparting resin includes, but not limited to, a resin of rosin derivative, a terpene resin such as high-molecular β-pinene, a coumarone-indene resin, a petroleum hydrocarbon resin, etc. These resins may be used individually or in any combination of two or more thereof.

Preferable examples of the petroleum hydrocarbon resin include aliphatic petroleum resins, aromatic petroleum resins, dichloropentadiene petroleum resins, copolymer petroleum resins, hydrogenated petroleum resins, alicyclic petroleum resins, etc. Among the aliphatic petroleum resins, it is preferred to employ one having five carbon atoms. Among the aromatic petroleum resins, it is preferred to employ one having nine carbon atoms. The compounding ratio of the adhesion imparting resin is preferably in a range of from 0.5 to 60% by mass by ordinary, and more preferably in a range of from 10 to 35% by mass, relative to the amount of a resin forming a part of the polyolefin resin layer. If the compounding ratio of the adhesion imparting resin is less than 0.5% by mass, the polyolefin resin layer possibly becomes defective in adhesion. On the other hand, If the compounding ratio of the adhesion imparting resin exceeds 60% by mass, the polyolefin resin layer possibly produces necking during formation.

Preferable examples of the adhesive resin include ionomer, ethylene vinyl acetate copolymers (EVA), ethylene-acryl copolymers, metal salts of them, etc. The compounding ratio of the adhesive resin is preferably in a range of from 20 to 500% by mass, and more preferably in a range of from 50 to 200% by mass, relative to the amount of a resin forming a part of the polyolefin resin layer. The adhesive resin may be used in combination with the adhesion imparting resin.

The polyolefin resin layer is formed by melting the titanium oxide contained pellets and diluting the molten pellets with a resin as one of the components of the polyolefin resin layer, if desired, and applying a coating of the molten material on the base paper by an ordinary lamination process, a sequential lamination process, or a lamination process using a laminator with a mono- or multi-layer extrusion die such as of a feet block type, a multi-manifold type, a multi-slot type. General examples of the mono- or multi-layer die include, but not limited in shape to, a T-shaped die, a coat hanger die, etc. It is preferred to apply a corona discharge treatment, a flame treatment, a glow discharge treatment or a plasma discharge treatment for surface activity before forming the polyolefin resin layer on the base paper.

The thickness of the polyolefin resin layer that is formed on the front surface of the support (the side where a image recording layer is formed) is preferably in a range of from 10 to 60 μm. On the other hand, the thickness of the polyolefin resin layer that is formed on the back surface of the support is preferably in a range of from 10 to 50 μm. The top layer of the polyolefin resin layer on the front surface of the support is finished off with a textured finish to a glossy surface or a fine-grain surface, matted surface or a silk surface such as disclosed in Japanese Unexamined Patent Publication No. 55-26507. The top layer of the polyolefin resin layer on the back surface of the support is finished off with a textured finish to a mat surface. It may be performed to apply a surface activation treatment such as a corona discharge treatment, a flame treatment, etc. to the surfaces of the polyolefin resin layer after the a textured finish and further to apply a coating treatment after the activation treatment.

Mixing of the higher density polyethylene and the lower density polyethylene for use with the polyolefin resin layer is not bounded by process. For example, after melting and mixing given amounts of higher density polyethylene and the lower density polyethylene and, if desired, various additives by an extrusion machine for kneading, a heat mixing roller, a Banbury mixer, a kneader, etc., the mixture is pulverized or shaped into pellets.

(Process of Manufacturing the Support for Image Recording Paper)

The process of manufacturing the support for the image recording material of the present invention includes a step of making base paper from paper pulp. In the paper making step, the pulp paper is subjected to formation trimming by means of any one selected among shaking with the use of a shake with a swing of 10 mm or greater, dandy rolling with the use of a dandy roller having a wire mesh of from 40 to 100 mesh and calendering with the use of a metal roller at a surface temperature of 140° C. In any case, the processing is preferably performed by means of a Fourdrinier paper machine.

(Image Recording Paper)

The image recording material of the present invention comprises at least support such as described above and an image forming layer formed on the support. There are various image recording paper different according to intended purposes and types, e.g. electrophotographic paper, heat-sensitive recording paper, ink jet printing paper, sublimation transfer recording paper, silver halide photographic paper, thermal transfer recording paper, etc.

(Electrophotoelectric Paper)

The electrophotographic paper of the present invention comprises the support described above and at least one toner image recording layer formed on at least one of opposite surfaces of the support and may further comprise additional layers including, for example, a surface protective layer, an intermediate layer, an undercoating layer, a cushioning layer, an electrostatic charge adjusting or antistatic layer, a reflective layer, a color tinge adjusting layer, a storage stability or quality improvement layer, an anti-adhesion layer, an anti-curling layer, a smoothing layer, etc. as appropriate. Each of these layers may have a single layer structure or a multi-layered structure.

[Toner Image Recording Layer]

The toner image recording layer receives a color toner image or a black toner image. The toner image is transferred to the toner image recording layer from a developing drum or an intermediate image transfer material with electrostatics or pressure in a transfer process and then fixed in a fixing process.

The toner image recording layer is preferred to have a transparency less than 78%, preferably less than 73% and most preferably less than 72%, of light transmittance in light of providing a feel of a kind of photograph. The light transmittance can be obtained from measurements as to a sample toner image recording layer that is the same in structure and thickness as the substantive toner image recording layer but coated on a polyethylene terephthalate film (100 μm) measured by a direct reading Hayes meter (Suga Testing Machine HGM-2DP). A material for the toner image recording layer contains at least a thermoplastic resin and, may be added with various additives such as a releasing agent, a plasticizer, a coloring agent, a filler, a cross-linking agent, an electrification controlling agent, an emulsifier, a dispersing agent, etc. for the purpose of improving the thermodynamic properties.

-Thermoplastic Resin-

The thermoplastic resin is not limited as long as it is transformable under a specific temperature condition in a fixing process. Since, in many toners, a copolymer resins of a polyester resin, styrene, styrene-butyl acrylate, etc., the same copolymer resins are preferably used for the electrophotographic image recording paper specifically, it is preferred that the electrophotographic image recording paper contains more than 20% of a copolymer of a polyester resin, styrene or styrene-butyl acrylate. Further preferable examples of the thermoplastic resin include styrene-acrylic ester copolymer, styrene-methacrylic ester copolymer, etc. More specifically, it is preferred to employ as the thermoplastic resin (a) a resin having an ester bond or the like, (b) a polyurethane resin or the like, (c) a polyamide resin or the like, (d) a polysulfone resin or the like, (e) polyvinyl chloride resin or the like, (f) a polyvinyl butyral resin or the like, (g) a polycaprolactone resin or the like, or (h) a polyolefin resin or the like.

Preferable examples of (a) the resin having an ester bond include polyester resins obtained in the form of a condensation product of a dicarboxylic acid component (which may include a substituted sulfonic acid group or a substituted carboxyl group) such as a terephthalic acid, an isophthalic acid, a maleic acid, a fumaric acid, a phthalic acid, an adipic acid, a sebacic acid, an azelaic acid, an abietic acid, a succinic acid, a trimellitic acid, a pyromellitic acid, etc and an alcoholic component (which may include a substituted hydroxyl group) such as ethylene glycol, diethylene glycol, propylene glycol, bisphenol A, diether derivatives of bisphenol A, (for example, adducts of ethylene oxide, propylene oxide or both to bisphenol A, bisphenol S, 2-ethylcyclohexyldimethanol, neopentyl glycol, cyclohexyldimethanol, glycerin, etc.; polyacrylic ester resins or polymethacrylic ester resins such as polymethyl methacrylate, polybutyl methacrylate, polymethyl acrylate, polybutyl acrylate, etc.; polycarbonate resins; polyvinyl acetate resins; styrene acrylate resins; styrene-methacrylic acid ester copolymer resins; vinyltoluene acrylate resins; etc. More specifically, there are various examples disclosed in Japanese Unexamined Patent Publication Nos. 59(1984)-101359, 60(1985)-294862, 63(1988)-7971, 63(1988)-7972, 63(1988)-7973.

Commercially available examples of the polyester resin include, but not limited to, Vyron103, Vyron200, Vyron280, Vyron300, VyronGK-130 and VyronGK-140 (which are manufactured by Toyobo Co., Ltd.); TafutonNE-382, TafutonU-5, TafutonATR-2009 and TafutonATR-2010 (which are manufactured by Kao Co., Ltd.); Elitel UE3500, Elitel UE3210, Elitel XA-8153, (which are manufactured by Unitika Ltd.); Polyester TP-220 and Polyester R-188 (which are manufactured by Nippon Synthetic Chemical Industry Co., Ltd.); etc. Commercially available examples of the acrylate resin include, but not limited to, Dianal SE-5437, Dianal SE-5102, Dianal SE-5377, Dianal SE-5649, Dianal SE-5466, Dianal SE-5482, Dianal HR-169, Dianal HR-124, Dianal HR-1127, Dianal HR-116, Dianal HR-113, Dianal HR-148, Dianal HR-131, Dianal HR-470, Dianal HR-634, Dianal HR-606, Dianal HR-607, Dianal LR-1065, Dianal LR-574, Dianal LR-143, Dianal LR-396, Dianal LR-637, Dianal LR-162, Dianal LR-469, Dianal LR-216, Dianal BR-50, Dianal BR-52, Dianal BR-60, Dianal BR-64, Dianal BR-73, Dianal BR-75, Dianal BR-77, Dianal BR-79, Dianal BR-80, Dianal BR-83, Dianal BR-85, Dianal BR-87, Dianal BR-88, Dianal BR-90, Dianal BR-93, Dianal BR-95, Dianal BR-100, Dianal BR-101, Dianal BR-102, Dianal BR-105, Dianal BR-106, Dianal BR-107, Dianal BR-108, Dianal BR-112, Dianal BR-113, Dianal BR-115, Dianal BR-116 and Dianal BR-117 (which are manufactured by Mitsubishi Rayon Co., Ltd.); Esrex PSE-0020, Esrex SE-0040, Esrex SE-0070, Esrex SE-0100, Esrex SE-1010 and Esrex SE-1035 (which are manufactured by Sekisui Chemical Co., Ltd.); Hymar ST95 and Hymar ST120 (which are manufactured by Sanyo Chemical Industry Co., Ltd.); and FM601 (which are manufactured by Mitsui Chemical Co., Ltd.).

Preferred examples of (e) the polyvinyl chloride resin include a polyvinylidene chloride resin, a vinyl chloride-vinyl acetate copolymer resin, a vinyl chloride-vinyl propionate copolymer resin or the like.

Preferred examples of (f) the polyvinyl butyral resin include a polyol resin, an ethyl cellulose resin, a cellulose resin such as a cellulose acetate resin, etc. The polyvinyl butyral resin is preferable to have the content of polyvinyl butyral greater than 70% by mass and an average degree of polymefization higher than 500 and more preferably higher than 1000. Commercially available examples of the polyvinyl butyral resin include Denka Butral 3000-1, Denka Butyral 4000-2, Denka Butyral 5000A and Denka Butyral 6000C (which are manufactured by Denki Kagaku Kogyo K.K.); Esrex BL-1, Esrex BL-2, Esrex BL-3, Esrex BL-S, Esrex BX-L, Esrex BM-1, Esrex BM-2, Esrex BM-5, Esrex BM-S, Esrex BH-3, Esrex BX-1 and Esrex BX-7 (which are manufactured by Sekisui Chemical Co., Ltd.); etc.

Preferred examples of (g) the polycaprolactone resin include a styrene-maleic anhydride resin, a polyacrylonitrile resin, a polyether resin, an epoxy resin, a phenol resin, etc.

Preferred examples of (h) the polyolefin resin include a polyethylene resin, a polypropylene resin, a copolymer resin of olefin such as ethylene or propylene and a vinyl monomer, an acrylic resin, etc.

These thermoplastic resins may be used individually or in any combination of two or more thereof, mixture of them or copolymers of them.

It is preferred for the thermoplastic resin to satisfy the solid state property that the toner image recording layer has to have. Two or more thermoplastic resins different in solid state property from one another may be used in combination. It is preferred that the thermoplastic resin has a molecular weight greater than the thermoplastic resin that is used for a toner. However, that this relationship of molecular weight between them is not always preferable according to the correlation of thermodynamic properties between them. For example, in the case where the thermoplastic resin for the toner image recording layer has a softening temperature higher than the toner, it is preferred that the thermoplastic resin for the toner imager recording layer has a molecular weight equal to or smaller than that of the toner. It is also preferred to use a mixure of thermoplastic resins that are the same in composition but different in average molecular weight. The thermoplastic resins used for the toner and the toner image recording layer, respectively, are correlated with each other in terms of molecular weight as disclosed in Japanese Unexamined Patent Publication No. 8 (1996)-334915.

It is preferred that the distribution of molecular weight of the thermoplastic resin for the toner image recording layer is wider than that for the toner. It is preferred for the thermoplastic resin for the toner image recording layer to satisfy the solid state properties disclosed in, for example, Japanese Patent Publication No. 5 (1993)-127413, Japanese Unexamined Patent Publication Nos. 8(1996)-194394, 8(1996)-334915, 8(1996)-334916,9(1997)-171265 or 10(1998)-221877.

The thermoplastic resin used for the toner image recording layer is of an aqueous type such as a water-soluble resin or a water-dispersant resin for the following reasons (i) and (ii):

(i) The aqueous type of resin spins off no organic solvent emission in the coating and drying process and, in consequence, excels at environmental adaptability and workability;

(ii) A releasing agent such as wax is hardly soluble in water at an ambient temperature in many instances and is often dispersed in a solvent such as water or an organic solvent prior to use. The water-dispersant type of resin is stable and excels at manufacturing process adaptability. In addition, wet or aqueous coating causes wax to easily bleed onto a surface during a coating and drying process, so as thereby to bring out effects of the releasing agent (offset resistance, adhesion resistance, etc.).

The aqueous resin is not always bounded by composition, bond-structure, molecular geometry, molecular weight, molecular weight distribution, conformation. inasmuch as it is of a water-soluble type or a water-dispersant type. Preferred examples of the hydrophilic or water-attracting group of polymer include a sulfonic acid group, a hydroxyl group, a carboxylic acid group, an amino group, an amid group, an ether group, etc.

Preferred examples of the water-soluble resin include those disclosed in Research Disclosure No. 17-643, page 26; No. 18-716, page 651; No. 307-105, pages 873–874; and Japanese Unexamined Patent Publication No. 64(1989)-13546, pages 71–75. More specifically, available examples of the water-soluble resin include a vinyl pyrrolidone-vinyl acetate copolymer, a styrene-vinyl pyrrolidone copolymer, a styrene-maleic anhydride copolymer, water-soluble polyester, water-soluble acryl, water-soluble polyurethane, water-soluble nylon and a water-soluble epoxy resin. Further, gelatin is selected from a group of lime-treated gelatin, acidized-gelatin, what is called delimed gelatin that has a reduced lime content as appropriate. These gelatin may be used individually or preferably used in any combination of two or more of them. Commercially available gelatins include various types of Pluscoat (which are manufactured by Gao Chemical Industry Co., Ltd.), various types of Fintex ES series (which are manufactured by Dainippon Ink & Chemical Inc.), both of which are of a water-soluble polyester; various types of Jurimar AT series (which are manufactured by Nippon Fine Chemical Co., Ltd.), Fintex 6161 and Fintex K-96 (which are manufactured by Dainippon Ink & Chemical Inc.), and Hyros NL-1189 and Hyros BH-997L (which are manufactured by Seiko Chemical Industry Co., Ltd.), all of which are of water-soluble acryl.

Preferred examples of the water-dispersant resin include a water-dispersant acrylic resin, a water-dispersant polyester resin, a water-dispersant polystyrene resin, a water-dispersant urethane resin, etc; emulsion such as an acryl resin emulsion, a polyvinyl acetate emulsion, an SBR (styrene•butadiene•rubber) emulsion or the like; and a water dispersion resin or emulsion of thermoplastic resin (a)~(h), copolymer of the thermoplastic resin (a)~(h), a mixture of the thermoplastic resin (a)~(h), and any one of the thermoplastic resin (a)~(h) that is cation-modified. These water-dispersant resins may be used individually or in any combination of two or more of thereof.

Commercially available examples of the water-dispersant resins include resins of Vyronal series (which are manufactured by Toyobo Co., Ltd.); resins of Pesuresin A series (which are manufactured by Takamatsu Oil & Fats Co., Ltd.); resins of Tafuton UE series (which are manufactured by Kao Co., Ltd.); resins of Polyester WR series (which are manufactured by Nippon Synthetic Chemical Industry Co., Ltd.) and resins of Eliel series (which are manufactured by Unitika Ltd.), all of which are of a polyester type, and resins of Hyros XE series, resins of KE series and resins of PE series (which are manufactured by Seiko Chemical Industry Co., Ltd.) and resins of Jurimar ET series (which are manufactured by Nippon Fine Chemical Co., Ltd.), all of which are of an acrylic type. It is preferred for the polymer to have a melt flow temperature (MFT) higher than an ambient temperature for storage before printing and lower than 100° C. for fixing toner particles.

It is preferred that the toner image recording layer has a thickness greater than ½ of the particle size of a toner used therein and more preferably a thickness one to three times as thick as the particle size of a toner used therein, or otherwise, a thickness disclosed in Japanese Unexamined Patent Publication No. 5(1993)-216322 or 7(1995)-301939. More precisely, the thickness of the toner image recording layer is preferably in a range of from 1 to 50 μm and more preferably in a range of from 5 to 15 μm.

In light of the adjustability of light transmittance, in particular whiteness, of the toner image recording layer, The toner image recording layer may contain components other than the thermoplastic resin such as a coloring agent such as pigments and dyes. Examples of the additional component include various additives for improving thermodynamic characteristics of the toner image recording layer such as a plastisizing agent, a releasing agent, a lubricating agent, a matting agent, a filler, a cross-linking agent, an electrostatic charge control agent, an emulsifier, a dispersing agent, It is preferred that the toner image recording layer contains the thermoplastic resin more than 50% by mass and more preferably in a range of from 50 to 90% by mass.

-Coloring Agent-

Preferred examples of the coloring agent include fluorescent brightening agents, white pigments, colored pigments, dye, etc. The fluorescent brightening agent is a compound that has absorptive power in a near-ultraviolet range and generates fluorescence in a range of from 400 to 500 nm. A number of conventional fluorescent coloring agents can be used without being particularly bounded by types. Preferred examples of the fluorescent brightening agent include compounds disclosed in "The Chemistry of Synthetic Dyes" by K. Veen Ratarman, Vol. 8, Chapter 8. More specific examples of the compound include stilbene compounds, coumarin compounds, biphenyl compounds, benzooxazoline compounds, naphthalimide compounds, pyrazoline compounds, carbostyryl compounds, etc. Commercially available examples include White Fulfa PSN, White Fulfa PHR, White Fulfa HCS, White Fulfa PCS and White Fulfa B which are manufactured by Sumitomo Chemical Co., Ltd., and UVITEX-OB manufactured by Ciba-Geigy Ltd.

Preferred example of the white pigment include inorganic pigments (e.g. a titanium oxide, calcium carbonate, etc.) that will be described in connection with fillers later. Preferred examples of the colored pigment include various pigments disclosed in, for example, Japanese Unexamined Patent Publication No. 63-44653, and azoic pigment (e.g. azolake pigment such as cannine 6B and red 2B; insoluble azo pigment such as monoazo yellow, disazo yellow, pyrazolo orange and Balkan orange; condensed azo pigment such as chromophthal yellow or chromophthal red); polycyclic pigment (e.g. phthalocyanine pigment such as copper phthalocyanine blue and copper phthalocyanine green; dioxazine pigment such as dioxazine violet; and isoindolynone pigment such as indolynone yellow; slen pigment such as perylene, perynon, flavantron and thioindigo); lake pigment (e.g. malachite green, rhodamine B, rhodamine G and Victoria blue B); and inorganic pigment (e.g. an oxide; a titanium dioxide; colcothar; sulfate such as precipitated barium sulfate; carbonate such as precipitated calcium carbonate; silicate such as hydrated silicate and anhydrous silicate; metal powder such as aluminum powder, bronze powder, blue powder, carbon black, chrome yellow, iron blue; and the like. These organic pigments may be used individually or in any combination of two or more. Among them, the titanium oxide is the most preferable pigment.

The pigment is preferred to have a shape of, but not limited to, a hollow particle in light of heat transmission (low heat conduction).

Various conventional dyes such oil-soluble dyes and water-insoluble dyes as the coloring agent. Examples of the oil-soluble dye include anthraquinone compounds and azo compounds. Preferred examples of the water-insoluble dye include vat dyes such as C.I.Vat violet 1, C.I.Vat violet 2, C.I.Vat violet 9, C.I.Vat violet 13, C.I.Vat violet 21, C.I.Vat blue 1, C.I.Vat blue 3, C.I.Vat blue 4, C.I.Vat blue 6, C.I.Vat blue 14, C.I.Vat blue 20, C.I.Vat blue 35 and the like; disperse dyes such as C.I. disperse violet 1, C.I. disperse violet 4, C.I. disperse violet 10, C.I. disperse blue 3, C.I. disperse blue 7, C.I. disperse blue 58 and the like; and oil-soluble dyes such as C.I. solvent violet 13, C.I. solvent violet 14, C.I. solvent violet 21, C.I. solvent violet 27, C.I. solvent blue 11, C.I. solvent blue 12, C.I. solvent blue 25, C.I. solvent blue 55 and the like. Colored couplers used for silver halide photography can be preferably utilized.

The content of coloring agent is preferably in a range of from 0.1 to 8 $g/m^2$, and more preferably in a range of from 0.5 to 5 $g/m^2$, with respect to the toner image recording layer (surface). If the content of coloring agent is less than 0.1 $g/m^2$, the toner image recording layer has a light transmittance too high. On the other hand, if the content of coloring agent content is beyond 8 $g/m^2$, the toner image recording layer is apt to become poor in tractability against adhesion resistance and cracks in some cases. The pigment content is preferably less than 40% by mass, more preferably less than 30% by mass, and most preferably less than 20% by mass, with respect to the total mass of thermoplastic resin of the toner image recording layer.

-Releasing Agent-

The releasing agent is blended in the toner image recording layer to prevent the toner image recording layer from offsetting. The releasing agent is not limited in type as long as it melts at a fixing temperature sufficiently enough to separate out onto the surface of the toner image recording layer in a mal-distribution state and further forms a layer of releasing material on the toner image recording layer resulting from being cooled and solidified. Among them, a silicon oil, a polyethylene wax, a carnauba wax, silicon particles and polyethylene wax particles are preferred.

Specifically, there are a number of releasing agents such as compounds disclosed in "Revised Edition: Property and Application of Wax" (published by Koushobou) and "Silicone Handbook" (published by Nikkan Kogyo Shinbun).

Further, it is preferred to use silicone compounds, fluorine compounds and wax that are used for the toner disclose in Japanese Patent Nos. 2,838,498 and 2,949,558; Japanese Patent Publication Nos. 59(1984)-38581 and 4(1992)-32380; Japanese Unexamined Patent Publication Nos. 50(1975)-117433, 52(1977)-52640, 57(1982)-148755, 61(1986)-62056, 61(1986)-62057, 61(1986)-118760, 2(1990)-42451, 3(1991)-41465, 4(1992)-212175, 4(1992)-214570, 4(1992)-263267, 5(1993)-34966, 5(1993)-119514, 6(1994)-59502, 6(1994)-161150, 6(1994)-175396, 6(1994)-219040, 6(1994)-230600, 6(1995)-295093, 7(1995)-36210, 7(1995)43940, 7(1995)-56387, 7(1995)-56390, 7(1995)-64335, 7(1995)-199681, 7(1995)-223362, 7(1995)-287413, 8(1996)-184992, 8(1996)-227180, 8(1996)-248671, 8(1996)-2487799, 8(1996)-248801, 8(1996)-278663, 9(1997)-152739, 9(1997)-160278, 9(1997)-185181, 9(1997)-319139, 9(1997)-319413, 10(1998)-20549, 10(1998)-48889, 10(1998)-198069, 10(1998)-207116, 11(1999)-2917, 11(1999)-449669, 11(1999)-65156, 11(1999)-73049 and 11(1999)-194542. These compounds can be used individually or in any combination of two or more thereof.

More specifically, preferred examples of the silicone compound include a non-modified silicone oil such as a dimethyl siloxane oil, a methyl hydrogen silicone oil and a phenylmethyl silicone oil (commercially available examples include KF-96, KF-96L, KF-96H, KF-99, KF-50, KF-54, KF-56, KF-965, KF-968, KF-994, KF-995, HFVAC, F-4, F-5 which are manufactured by Shinetsu Chemical Industry Co., Ltd.; SH200, SH203, SH490, SH510, SH550, SH710, SH704, SH705, SH7028A, SH7036, SM7060, SM7001, SM7706, SM7036, SH871107, SH8627 which are manufactured by Toray Dow Corning Silicone Co.; Ltd.; TSF400, TSF401, TSF404, TSF405, TSF431, TSF433, TSF434, TSF437, TSF450, TSF451, TSF456, TSF458, TSF483, TSF484, TSF4045, TSF4300, TSF4600, YF-33, YF-3057 YF-3800, YF-3802 YF-3804, YF-3807, YF-3897, XF-3905, XS69-A1753, TEX100, TEX101, TEX102, TEX103, TEX104, TSW831 which are manufactured by Toshiba Silicone Co., Ltd.); an amino-modified silicone oil (commercially available examples include KF-857, KF-858, KF-859, KF-861, KF-864 and KF-880 which are manufactured by Shinetsu Chemical Industry Co., Ltd.; SF8417 and SM8709 which are manufactured by Toray Dow Coming Silicone Co., Ltd.; and TSF4700, TSF4701, TSF4702, TSF4703, TSF4704, TSF4705, TSF4706, TEX150, TEX151 and TEX154 which are manufactured by Toshiba Silicone Co., Ltd.); a carboxy-modified silicone oil (commercially available examples include BY-16-880 manufactured by Toray Dow Corning Silicone Co., Ltd.; and TFS4770 and XF42-A9248 which are manufactured by Toshiba Silicone Co., Ltd.); a carbinol-modified silicone oil (commercially available examples include XF42-B0970 manufactured by Toshiba Silicone Co., Ltd.); a vinyl-modified silicone oil (commercially available examples include XF40-A1987 manufactured by Toshiba Silicone Co., Ltd.); an epoxy-modified silicone oil (commercially available examples include SF8411 and SF8413 which are manufactured by Toray Dow Coning Co., Ltd.; and TSF3965; and TSF3965, TSF4730, TSF4732, XF42-A4439, XF42-A4438, XF42-A5041, XC96-A4462, XC96-A4462, XC96-A4463, XC96-A4464 and TEX-170 which are manufactured by Toshiba SiliconeCo., Ltd.); a polyether-modified silicone oil (commercially available examples include KF-351(A), KF-352 (A), KF-353(A), KF-354(A), KF-355(A), KF-615(A), KF-618(A) and KF-945(A) which are manufactured by Shinetsu Chemical Industry Co., Ltd.; SH3746, SH3771, SH8421, SH8419, SH8400 and SH8410 which are manufactured by Toray Dow Corning Silicone Co., Ltd.; and TSF4440, TSF4441, TSF4445, TSF4446, TSF4450, TSF4452, TSF4453 and TSF4460 which are manufactured by Toshiba Silicone Co., Ltd.); a silanol-modified silicone oil; a methacryl-modified silicone oil; a mercapto-modified silicone oil; an alcohol-modified silicone oil (commercially available examples include SF8427 and SF8428 which are manufactured by Toray Dow Corning Silicone Co., Ltd.; and TSF4750, TSF4751 and XF42-B0970 which are manufactured by Toshiba Silicone Co., Ltd.); an alkyl-modified silicone oil (commercially available examples include SF8416 which is manufactured by Toray Dow Coming Silicone Co., Ltd.; and TSF410, TSF411, TSF4420, TSF4421, TSF4422, TSF4450, XF42-334, XF42-A3160 and XF42-A3161 which are manufactured by Toshiba Silicone Co., Ltd.); a fluorine-modified silicone oil (commercially available examples include SF1265 which is manufactured by Toray Dow Corning Silicone Co., Ltd.; and FQF502 which is manufactured by Toshiba Silicone Co., Ltd.); silicone rubber or silicone particulates (commercially available examples include SH851U, SH745U, SH55UA, SE4705U, SH502UA&B, SRX539U, SE6770-P, DY38-038, DY38-047, TrefilF-201, TrefilF-202, TrefilF-250, TrefilR-900, TrefilR902A, TrefilE-500, TrefilE-600, TrefilE-601, TrefilE-506 and TrefilBY29-119 which are manufactured by Toray Dow Corning Silicone Co., Ltd.; and Tospal105, Tospal120, Tospal130, Tospal145, Tospal250 and Tospal3120 which are manufactured by Toshiba Silicone Co., Ltd.); a silicone-modified compound of a silicone resin such as an olefin resin, a polyester resin, a vinyl resin, a polyamide resin, a cellulose resin, a phenoxy resin, a vinyl chloride-vinyl acetate resin, an urethane resin, an acryl resin, a styrene-acryl resin and copolymers of these resins (commercially available examples include Dialoma SP203, Dialoma SP712, Dialoma SP2105 and Dialoma SP2023 which are manufactured by Dainichiseika Color & Chemicals Mfg. Co., Ltd.; Modipa FS700, Modipa FS710, Modipa FS720, Modipa FS730 and Modipa FS770 which are manufactured by Nippon Oils & Fats Co., Ltd.; Saimack US-270, Saimack US-350, Saimack US-352, Saimack US-380, Saimack US413, Saimack US450, Rezeda GP-705, Rezeda GS-30, Rezeda GF-150 and Rezeda GF-300 which are manufactured by Toa Gosei Chemical Industry Co., Ltd.; SH997, SR2114, SH2104, SR2115, SR2202, DCI-2577, SR2317, SE4001U, SRX625B, SRX643, SRX439U, SRX488U, SH804, SH840, SR2107 and SR2115 which are manufactured by Toray Dow Corning Silicone Co., Ltd.; and YR3370, TSR1122, TSR102, TSR108, TSR116, TSR117, TSR125A, TSR127B, TSR144, TSR180, TSR187, YR47, YR3187, YR3224, YR3232, YR3270, YR3286, YR3340, YR3365, TEX152, TX153, TEX171 and TEX172 (which are manufactured by Toshiba Silicone Co., Ltd.); and a reactive silicone compound such as an addition reaction type reactive silicone compound, a peroxide curing type reactive silicone compound and an ultraviolet curing type reactive silicone compound (commercially available examples include TSR1500, TSR1510, TSR1511, TSR1515, TSR1520, YR3286, YR3340, PSA6574, TPR6500, TPR6501, TPR6600, TPR6702, TPR6604, TPR6701, TPR6705, TPR6707, TPR6708, TPR6710, TPR6712, TPR6721, TPR6722, UV9315, UV9425, UV9430, XS56-A2775, XS56-A2982, XS56-A3075, XS56-A3969, XS56-A5730, XS56-A8012, XS56-B1794, SL6100, SM3000 SM3030, SM3200 and YSR3022 which are manufactured by Toshiba Silicone Co., Ltd.

Preferred examples of the fluorine compound include a fluorine oil (commercially available examples include Dyfloyl #1, Dyfloyl #3, Dyfloyl #10, Dyfloyl #20, Dyfloyl #50, Dyfloyl #100, Unidyn TG-440, Unidyn TG-440, Unidyn TG-452, Unidyn TG-490, Unidyn TG-560, Unidyn TG-561, Unidyn TG-590, Unidyn TG-652, Unidyn TG-670U, Unidyn TG-991, Unidyn TG-999, Unidyn TG-3010, Unidyn TG-3020 and Unidyn TG-3510 which are manufactured by Daikin Kogyo Co., Ltd.; MF-100, MF-110, MF-120, MF-130, MF-160 and MF-160E which are manufactured by Tokem Products Co., Ltd.; Surflon S-111, Surflon S-112, Surflon S-113, Surflon S-121, Surflon S-131, Surflon S-132, Surflon S-141 and Surflon S-145 which are manufactured by Asahi Glass Co., Ltd.; and FC-430 and FC431 which are manufactured by Mitsui Phluoro Chemicals Co., Ltd.); fluorine rubber (commercially available examples include LS63U which is manufactured by Toray Dow Coming Silicone Co., Ltd.); a fluorine-modified resin (commercially available examples include Modipa F200, Modipa F220, Modipa F600, Modipa F2020 and Modipa F3035 which are manufactured by Nippon Oils & Fats Co., Ltd.; Dialoma FF203 and Dialoma FF204 which are manufactured by Dainichiseika Color & Chemicals Mfg. Co., Ltd.; Surflon S-381, Surflon S-383, Surflon S-393, Surflon SC-101, Surflon SC-105, Surflon KH-40 and Surflon SA-100 which are manufactured by Asahi Glass Co., Ltd.; EF-351, EF-352, EF-801, EF-802, EF-601, TFE, TFEMA and PDFOH which are manufactured by Tokem Products Co., Ltd., and THV-200P which is manufactured by Sumitomo 3M Ltd.); a fluorosulfonate compound (commercially available examples include EF-101, EF-102, EF-103, EF-104, EF-105, EF-112, EF-121, EF122A, EF122B, EF-122C, EF-123A, EF-123B, EF-125M, EF-132, EF-135M, EF-305, FBSA, KFBS and LFBS which are manufactured by Tokem Products Co., Ltd.); a fluorosulfonic acid; a fluoride compound or a salt of fluoride compound (e.g. an anhydrous fluoric acid, a dilute fluoric acid, a fluoroboric acid, zinc fluorobolite, nickel fluoroborate, tin fluorobolite, lead fluorobolite, cupric fluoroborate, a hydrofluosilicic acid, potassium titanate fluoride, a perfluoro caprylic acid, perfluoro ammonium octanate, etc.); and inorganic fluoride (e.g. aluminum fluoride, potassium silicofluoride, potassium zirconate fluoride, zinc fluoride tetrahydrate, potassium fluoride, lithium fluoride, bariurn fluoride, tin fluoride, potassium fluoride, acidic potassium fluoride, magnesium fluoride, titanic fluoride, ammonium phosphate hexafluoride, potassium phosphate hexafluoride, etc.).

Preferred examples of the wax include synthetic carbon hydride, modified wax, hydrogenated wax, natural wax, etc.

More specifically, preferred examples of the synthetic carbon hydride include polyethylene wax (commercially available examples include Polyron A, Polyron 393 and Polyron H-481 which are manufactured by Chukyo Oils & Fats Co., Ltd.; and Sunwax E-310, Sunwax E-330, Sunwax E-250P, Sunwax LEL-250, Sunwax LEL-800 and Sunwax LEL-400P which are manufactured by Sanyo Chemical Industry Co. Ltd.); polypropylene wax (commercially available examples include Viscol 330-P, Viscol 550-P and Viscol 660-P which are manufactured by Sanyo Chemical Industry Co., Ltd.); Fischer-Tropsch wax (commercially available examples include FT-100 and FT-0070 which are manufactured by Nippon Seiro Co., Ltd.); and an acid amide compound or an acid imide compound such as amide stearate or imide phthalic anhydride (commercially available examples include Serozole 920, Serozole B495, Himicron G-270, Himicron G-110 and Hidrin D-757 which are manufacture by Chukyo Oils & Fats Co.).

Preferred examples of the modified wax include such as amine-modified polypropylene (commercially available examples include QN-7700 which is manufactured by Sanyo Chemical Industry Co., Ltd.); acrylic acid-modified wax, fluorine-modified wax or olefin-modified wax; urethane type wax (commercially available examples include NPS-6010 and HAD-5090 which are manufactured by Nippon Seiro Co., Ltd.); and alcohol type wax (commercially available examples include NPS-9210, NPS-9215, OX-1949 and XO-020T which are manufactured by Nippon Seiro Co., Ltd.).

Preferred examples of the hydrogenated wax include hydrogenated castor oil (commercially available examples include Castor Wax which manufactured by Ito Oil Manufacturing Co., Ltd.); derivatives of castor oil (commercially available examples include dehydrated castor oil DCO, DCO Z-1, DCO-Z2, castor oil fatty acid CO-FA, ricinoleic acid, dehydrated castor oil fatty acid DCO-FA, dehydrated castor oil fatty acid epoxyester D-4 ester, castor oil urethane acrylate CA-10, CA-20, CA-30, castor oil derivative MINERASOL S-74, MINERASOL S-80, MINERASOL S-203, MINERASOL S42X, MINERASOL S-321, special castor oil condensed fatty acid MINERASOL RC-2, MINERASOL RC-17, MINERASOL RC-55, MINERASOL RC-335, special castor oil condensed fatty acid ester MINERASOL LB-601, MINERASOL LB-603, MINERASOL LB-604, MINERASOL LB-702, MINERASOL LB-703, MINERASOL #11 and MINERASOL L-164 which are manufactured by Ito Oil Manufacturing Co., Ltd.); stearic acid (e.g. 12-hydroxystearic acid manufactured by Ito Oil Manufacturing Co., Ltd.); lauric acid; myristic acid; palmitic acid; behenic acid; sebacic acid (e.g sebacic acid manufactured by Ito Oil Manufacturing Co., Ltd.); undecylenic acid (e.g. undecylenic acid manufactured by Ito Oil Manufacturing Co., Ltd.); heptyl acid (e.g. heptyl acid manufactured by Ito Oil Manufacturing Co., Ltd.); maleic acid; higher maleic oil (commercially available examples include HIMALEIN DC-15, HIMALEIN LN-10, HIMALEIN OO-15, HIMALEIN DF-20 and HIMALEIN SF-20 which are manufactured by Ito Oil Manufacturing Co., Ltd.); blown oil (commercially available examples include Serbonol #10, Serbonol #30, Serbonol #60, Serbonol R-40 and Serbonol S-7 which are manufactured by Ito Oil Manufacturing Co., Ltd.); and cyclopentadiene oil (commercially available examples include CP Oil and CP Oil-S which are manufactured by Ito Oil Manufacturing Co., Ltd.).

The natural wax comprises preferably one selected from a group of vegetable wax, animal wax, mineral wax and petroleum wax and more preferably vegetable wax. In light of the compatibility of natural wax with an aqueous thermoplastic resin used in the toner image recording layer, a water dispersed wax is preferred.

Preferred examples of the vegetable wax include carnauba wax (commercially available examples include EMUSTAR-0413 manufactured by Ito Oil Manufacturing Co., Ltd. and Serozole 524 manufactured by Chukyo Oils & Fats Co., Ltd.); castor oil (commercially available examples include castor oil manufactured by Ito Oil Manufacturing Co.); colza oils, soybean oils, sumac wax, cotton wax, rice wax, sugarcane wax, canderyla wax, Japan wax and jojoba oil. Among them, the carnauba wax, that has a melting temperature in a range of from 70 to 95° C., is especially preferred in terms of providing the electrophotographic image recording paper that excels in offset resistance, adhesion resistance, pass-though ability to pass though electrophotographic equipments, glossy impression, toughness against cracks, and capability for forming a high quality image.

Preferred examples of the animal wax include lanolin, spermaceti wax, blubber oil and wool wax.

Preferred examples of the mineral wax include montan wax, montan ester wax, ozokerite, ceresin, fatty acid ester (commercially available examples include Sensosizer DOA, Sensosizer AN-800, Sensosizer DINA, Sensosizer DIDA, Sensosizer DOZ, Sensosizer DOS, Sensosizer TOTM, Sensosizer TITM, Sensosizer E-PS, Sensosizer nE-PS, Sensosizer E-PO, Sensosizer E-4030, Sensosizer E-6000, Sensosizer E-2000H, Sensosizer E-9000H, Sensosizer TCP and Sensosizer C-1100 which are manufactured by Chukyo Oils & Fats Co., Ltd. Among them, the montan wax, that has a melting temperature in a range of from 70 to 95° C., is especially preferred in terms of providing the electrophotographic image recording paper that excels in offset resistance, adhesion resistance, pass-though ability to pass though electrophotographic equipments, glossy impression, toughness against cracks, and capability for forming a high quality image.

Preferred examples of the petroleum wax includes paraffin wax (commercially available examples include Paraffin Wax 155, 150, 140, 135, 130, 125, 120, 115, NHP-3, NHP-5, NHP-9, NHP-10, NHP-11, NHP-12, NHP-15G, SP-0160, SP-0145, SP-1040, SP-1035, SP-3040, SP-3035, NPS-8070, NPS-L-70, OX-2151, OX2251, EMUSTAR-0384 and EMUSTAR-0136 which are manufactured by Nippon Seiro Co., Ltd.; Serozole 686, 651-A, A, H-803, B460, E-172, 866, K-133, Hidrin D-337 and E-139 which are manufactured by Chukyo Oils & Fats Co., Ltd.; 125° Paraffin, 125° FP Paraffin, and 130° Paraffin, 135° Paraffin, 135° H Paraffin, 140° Paraffin, 140° N Paraffin, 145° Paraffin and Paraffin Wax M which are manufactured by Nisseki Mitsubishi Oil Co., Ltd.); microcrystalline wax (commercially available examples include Hi-Mic-2095, Hi-Mic-3090, Hi-Mic-1080, Hi-Mic-1070, Hi-Mic-2065, Hi-Mic-1045, Hi-Mic-2045, EMUSTAR-0001 and EMUSTAR-042X which are manufactured by Nippon Seiro Co., Ltd.; Serozole 967 and Serozole M which are manufactured by Chukyo Oils & Fats Co., Ltd.; 155 Microwax and 180 Microwax which are manufactured by Nisseki Mitsubishi Oil Co., Ltd.); petrolatum (examples of commercially available petrolatum include OX-1749, OX-0450, OX-0650B, OX-0153, OX-261BN, OX-0851, OX-0550, OX-0750B, JP-1500, JP-056R and JP-011P which are manufactured by Nippon Seiro Co., Ltd.); etc.

The natural wax content of the toner image recording layer (surface) is preferably in a range of from 0.1 to 4 $g/m^2$, and more preferably in a range of from 0.2 to 2 $g/m^2$. If the natural wax content is less than 0.1 $g/m^2$, significant deterioration of, in particular, offset resistance and adhesion resistance will occur. On the other hand, if the natural wax content is beyond 4 $g/m^2$, the amount of wax is too large to form a high quality image. It is desired for the natural wax to have a melting temperature preferably in a range of from 70 to 95° C., and more preferably in a range of from 75 to 90° C., in light of, in particular, offset resistance and pass-though ability to pass though electrophotographic equipments.

Materials conventionally used as a matting agent are utilized. Solid particles used for the matting agent are classified into two types, namely inorganic particles and organic particles. Preferred materials for the inorganic matting particle include oxides such as a silica dioxide, a titanium oxide, a magnesium oxide and an aluminum oxide; salts of alkaline earth metal such as barium sulfate, calcium carbonate and magnesium sulfate; silver halides such as a silver chloride and silver bromide; and glass.

More specifically, preferred examples of the inorganic matting agent include those disclose in West Germany Patent No. 2,529,321, British Patent Nos. 760775 and 1,260,772, U.S. Pat. Nos. 1,201,905, 2,192,241, 3,053,662, 3,062,649, 3,257,206, 3,322,555, 3,353,958, 3,370,951, 3,411,907, 3,437,484, 3,523,022, 3,615,554, 3,635,714, 3,769,020, 4,021,245 and 4,029,504.

Preferred materials for the organic matting agent include starch, cellulose ester (e.g. cellulose acetate propionate), cellulose ether (e.g. ethyl cellulose), and synthetic resins. The synthetic resin is preferably of a water-insoluble type or of a hardly soluble type. Preferred examples of the synthetic resin, water-insoluble or hardly soluble, include poly(meth)acrylic ester (e.g. polyalkyl(metha)-acrylate, polyalkoxyalkyl(meth)acrylate, polyglycidyl(meth)acrylate); poly(meth)acrylamide; polyvinyl ester (e.g. polyvinyl acetate); polyacrylonitrile; polyolefin (e.g. polyethylene); polystyrene; a benzoguanamine resin, a formaldehyde condensed polymer; an epoxy resin; polyamide; polycarbonate; a phenol resin; polyvinyl carbazole; polyvinylidene chloride; etc. Copolymers comprising a combination of monomers used for the above mentioned polymers may be used.

In the case of utilizing the copolymer, the copolymer may contain a small chain of hydrophilic repeating unit. Examples of the monomer forming a hydrophilic repeating unit include acrylic acid, methacrylic acid, α-unsaturated carboxylic acid, β-unsaturated carboxylic acid, hydroxyalkyl(meth)-acrylate, sulfoalkyl(meth)acrylate and styrene sulfonate.

Examples of the organic matting agent include those described in British Patent No. 1,055,713, U.S. Pat. Nos. 1,939,213, 2,221,873, 2,268,662, 2,322,037, 2,376,005, 2,391,181, 2,701,245, 2,992,101, 3,079,257, 3,262,782, 3,443,946, 3,516,832, 3,539,344, 3,591,397, 3,754,924 and 3,767,448, and Japanese Unexamined Patent Publication Nos. 49(1974)-106821 and 57(1982)-14835. These solid particles may be used individually or in any combination of two or more. The average particle size is preferably in a range of from 1 to 100 μm, and more preferably in a range of from 4 to 30 μm. The amount of used solid particles is preferably in a range of from 0.01 to 0.5 $g/m^2$, and more preferably in a range of from 0.02 to 0.3 $g/m^2$.

Derivatives, oxides, refined products or mixtures of these solid particles may be used as the releasing agent that is added to the toner image recording layer. Further, they may have a reactive substituent. It is preferred that the releasing agent has a melting temperature in a range of from 70 to 95° C., and more preferably in a range of from 75 to 90° C., in terms of providing the electrophotographic image recording paper that excels in offset resistance and pass-though ability to pass though electrophotographic equipments. The content of releasing agent is preferably in a range of from 0.1 to 10% by mass, more preferably in a range of from 0.3 to 8.0% by mass, and most preferably in a range of from 0.5 to 5.0% by mass, with respect to the total weight of toner image recording layer.

-Plastisizing Agent-

Various conventional plasticizing agents for resins can be used without any particular restrictions. The plasticizing agent has the function of controlling softening or melting of the toner image recording layer due to heat and/or pressure applied in the toner fixing process. The plasticizing agent can be selected consulting "Handbook Of Chemistry" by Chemical Society of Japan (published by Maruzen), "Plasticizer—Theory and Applications—" by Kouichi Murai (published by Koushobou), "Study On Plasticizer Vol. 1" and "Study On Plasticizer Vol. 2" both by Polymer Chemistry Association, "Handbook: Rubber•Plastics Compounding Chemicals" by Rubber Digest Ltd., etc.

Preferred examples of the plastisizing agent include ester such as phthalate, phosphate, fatty ester, abietate, adipate, sebacate, azelate, benzoate, butyrate, epoxidized fatty ester, glycolate, propionate, trimellitate, citrate, sulfonate, carboxylate, succinate, maleate, fumarate, stearate, etc.; amide such as fatty amide, sulfoamide, etc.; ether; alcohol; lactone; polyethyleneoxy and the like which are disclosed in, for example, Japanese Unexamined Patent Publication Nos. 59(1984)-83154, 59(1984)-178451, 59(1984)-178453, 59(1984)-178454, 59(1984)-178455, 59(1984)-178457, 61(1986)-09444, 61(1986)-2000538, 62(1987)-174745, 62(1987)-245253, 62(1987)-8145, 62(1987)-9348, 62(1987)-30247, 62(1987)-136646, and 2(1990)-235694. These plastisizing agent can be used as a mixture with a resin.

Comparatively low molecular weight polymers are used as the plasticizing agent. The molecular weight of the plastisizing agent is preferably lower than the molecular weight of a binder resin to be plastisized. More specifically, the molecular weight of the plastisizing agent is preferably lower than 15000 and more preferably lower than 5000. The polymer plastisizing agent is preferred to comprise the same polymer as the binder resin. For example, low molecular weight polyester is preferred for plastisizing a polyester resin. Further, oligomers can be used as the plastisizing agent.

There are commercially available plastisizing agents other than the above mentioned compounds. Commercially available examples include Adecasizer PN-170 and Adecasizer PN-1430 which are manufactured by Asahi Denka Kogyo K.K.; PARAPLEX-G-25, PARAPLEX-G-30 and PARAPLEX-G40 which are manufactured by HALL Corporation; and Estergum 8L-JA, Ester R-95, Pentaryn 4851, Pentaryn FK115, Pentaryn 4820, Pentaryn 830, Ruizol 28-JA, Picoratic A75, Picotex LC and Crystalex 3085 which are manufactured by Rika Hercules Co., Ltd. and the like.

It is possible to make arbitrary use of the plasticizing agent in order to alleviate stress or strain (physical strain due to elastic force or viscosity, strain due to material balance of molecules, main chains and pendants) that occurs when toner particles are buried in the toner image recording layer. The plasticizing agent may be present in the toner image recording layer in a microscopically dispersed state, a microscopically phase separated state like sea-island pattern or a state where the plasticizing agent has mixed with and dissolved in other components such as a binder sufficiently.

The content of plastisizing agent is preferably in a range of from 0.001 to 90% by mass, more preferably in a range of from 0.1 to 60% by mass, and most preferably in a range of from 1 to 40% by mass, with respect to the total weight of toner image recording layer.

The plasticizing agent may be utilized for the purpose of optimizing competence to slip (improved sliding mobility due to a reduction in frictional force), offset of a fixing area (separation of a toner layer to the fixing area), a curling balance and static build-up (formation of electrostatic toner image).

-Filler-

Preferred examples of the filler include organic fillers, inorganic fillers and those that have been known as stiffener, a loading material or a reinforcing material for a binder resin. The filler can be selected consulting "Handbook: Rubber•Plastics Composing Chemicals" (Rubber Digest Ltd.), "New Edition Plastic Composing Chemicals—Fundamentals And Applications" (Taiseisha), or "Filler Handbook" (Taiseisha).

Preferred examples of the inorganic filler (or inorganic pigment) include silica, alumina, a titanium dioxide, a zinc oxide, a zirconium oxide, an iron oxide like mica, zinc white, a lead oxide, a cobalt oxide, strontium chromate, molybdenum pigments, smectite, a magnesium oxide, a calcium oxide, a calcium carbonate, mullite, etc. Among them, silica or alumina is particularly preferable as the filler. These fillers may be used individually or in combination of two or more. The filler desirably comprises a smaller size of particulates. If the particle size of filler is large, the toner image recording layer is apt to have a rough surface.

There are two types of silica available for the filler, i.e. globular silica and amorphous silica. These silica can be synthesized in either a wet process, a dry process or an aerogel process. Surfaces of hydrophobic silica particles may be treated with a trimethylsilyl group or silicon. In this case, it is preferred to use colloidal silica particles. Further, the silica particles are preferably porous.

There are two types of alumina available for the filler, i.e. anhydrous alumina and alumina hydrate. The anhydrous alumina may be of a crystal form of α, β, γ, δ, ζ, η, θ, κ, ρ or χ. The anhydrous alumina is more preferable rather than the alumina hydrate. Preferred examples of the alumina hydrate are monohydrate such as pseudoboemite, boemite and diaspore, or trihydrate such as gibbsite and bayerite. The alumina particles are preferably porous.

The alumina hydrate can be synthesized in either a sol-gel process in which alumina is precipitated by adding ammonia in a solution of aluminum or a hydrolysis process in which an aluminate alkali is hydrolyzed. The anhydrous alumina can be derived by heating and dehydrating an alumina hydrate.

It is preferred to add the filler in a range of from 5 to 2000 parts by mass relative to 100 parts by dried mass of a binder of a layer to which the filler is added.

-Cross-Linking Agent-

The cross-linking agent is added for the purpose of providing the toner image recording layer with storage stability and adjusting thermoplasticity of the toner image recording layer. Compounds used for the cross-linking agent are those that have two or more reactive groups such as an epoxy group, an isocyanate group, an aldehyde group, an active halogen group, an active methylene group, an acetylene group or conventionally well known reactive group, in one molecule. In addition to those compounds, available compounds are those that have two or more groups capable of forming a bond through an ionic bond, a hydrogen bonding, a coordinate bond, etc.

Examples of the cross-linking agent include compounds conventionally known as a coupling agent, a hardening agent, a polymerizing agent, a polymerization promoter, a coagulating agent, a film forming ingredient, an auxiliary film forming ingredient and the like for resins. Preferred examples of the coupling agent include chlorosilane, vinylsilane, epoxysilane, aminosilane, alkoxyaluminum chelate, titanate coupling agents and those disclosed in "Handbook: Rubber Plastics Compounding Chemicals" (Rubber Digest Ltd.).

-Electrostatic Charge Control Agent-

It is preferred for the toner image recording layer to contain an antistatic or electrostatic charge adjusting agent for the purpose of controlling toner transfer and toner adhesion and preventing toner image recording layers from adhering to each other due to electrostatic charges. Preferred examples of the electrostatic charge adjusting agent include, but not limited to, surface-active agents such as cation surface-active agents, anion surface-active agents, ampholytic surface-active agents, nonionic surface-active agents and the like and, in addition, polyelectrolyte, electroconductive metal oxides and the like. Preferred examples include cation antistatic agents such as a quaternary ammonium salt, a polyamine derivative, cation-modified polymethylmethacrylate, cation-modified polystyrene and the like; anionic antistatic agents such as alkylphosphate, anion polymers and the like; and nonionic antistatic agents such as fatty ester, polyethylene oxides and the like. In the case where toner is charged with negative electricity, the cation antistatic agent or the nonionic antistatic agent is preferred.

Preferred examples of the electroconductive metal oxide include ZnO, TiO2, $SnO_2$, $Al_2O_3$, $In_2O_3$, $SiO_2$, MgO, BaO, $MoO_3$, etc. These electroconductive metal oxides may be used individually or in the form of complex oxide thereof The metal oxide may further contain or be doped with a hetero element. For example, ZnO may be doped with Al or In; $TiO_2$ may be doped with Nb or Ta; and $SnO_2$ may be doped with Sb, Nb or halogen.

-Other Additives-

A material for the toner image recording layer may contain various additives for the purpose of improving stability of an image formed thereon and stability of the image recording layer. In order to accomplish the purpose, preferred examples of the additive include an antioxidant, an antiaging agent, an antidegradation agent, antiozonant, an ultraviolet absorption agent, an metal complex, a light stabilizer, an antiseptic agent and a fungicide which are well known in the art.

Preferred examples of the antioxidant include chroman compounds, coumaran compounds, phenolic compounds (e.g. hindered phenol), hydroquinone derivatives, hindered amine derivatives, spiroindan compounds, etc. The antioxidants that are disclosed in, for example, Japanese Unexamined Patent Publication No. 61(1986)-159644 can be use.

The antiaging agent can be selected consulting "Handbook: Rubber•Plastics Compounding Chemicals $2^{nd}$ Revised Edition" (1993, Rubber Digest Ltd.), pages 76~121 .

Preferred examples of the ultraviolet absorption agent include benzotriazole compounds such as disclosed in U.S. Pat. No. 3,533,794, 4-thiazolidine compounds such as disclosed in U.S. Pat. No. 3,352,681, benzophenone compounds such as disclosed in Japanese Unexamined Patent Publication No. 46(1971)-2784, and ultraviolet absorption polymers such as disclosed in Japanese Unexamined Patent Publication No. 62(1987)-260152.

Preferred examples of the metal complex include those disclosed in, for example, U.S. Pat. Nos. 4,241,155, 4,245,018 and 4,254,195, Japanese Unexamined Patent Publication Nos. 61(1986)-88256, 62(1987)-174741, 63(1988)-199428, 1(1989)-75568 and 1(1989)-74272. In addition, ultraviolet absorption agents and light stabilizers that are listed in "Handbook: Rubber • Plastics Composing Chemicals $2^{nd}$ Revised Edition" (1993, Rubber Digest Ltd.), pages 122~137 are preferably used.

Photographic additives conventionally well known in the photographic art can be added to the material for the toner image recording layer. Preferred examples of the photographic additive include those disclosed in Research Disclosure Magazine (RD) Nos. 17643 (December 1978),18716 (November 1979) and 307105 (November 1989). These additives appear on the following pages:

| Additive | RD No. 17643 | RD No. 18716 | RD No. 307105 |
|---|---|---|---|
| Brightener | 24 | 648R | 868 |
| Stabilizer | 24–25 | 649R | 868–870 |
| Light Absorbent (UV Absorbent) | 25–26 | 649R | 873 |
| Color Image Stabilizer | 25 | 650R | 872 |
| Film Hardener | 26 | 651L | 874–875 |
| Binder | 26 | 651L | 873–874 |
| Plasticizer/Lubricant | 27 | 650R | 876 |
| Coating Auxiliary Agent (Surface-active agent) | 26–27 | 650R | 875–876 |
| Antistatic Agent | 27 | 650R | 976–977 |
| Matting Agent | | | 878–879 |

[Solid State Properties of Toner Image Recording Layer]

The following description will be directed to solid state properties of the toner image recording layer. The 180 degree exfoliation strength of the toner image recording layer at a fixing temperature of a fixing member is preferably les than 0.1 N/25 mm, and more preferably less than 0.041 N/25 mm. The 180 degree exfoliation strength is a measurement when estimated by the measuring method meeting JIS K6887 in which a surface material of the fixing member is used.

It is preferred for the toner image recording layer to have a high degree of whiteness, specifically higher than 85% when estimated by the measuring method meeting JIS P8123. It is preferred for the toner image recording layer to have a spectral reflection coefficient higher than 85% in a wavelength range of from 440 to 640 nm and a difference between the highest and the lowest spectral reflection coefficient less than 5% in the same wavelength range. It is also preferred for the toner image recording layer to have a spectral reflection coefficient higher than 85% in a wavelength range of from 400 to 700 nm and a difference between the highest and the lowest spectral reflection coefficient less than 5% in the same wavelength range.

More specifically, when specifying the degree of whiteness expressed in CIE 1976 (L*a*b*) color space, it is preferred for the toner image recording layer to have an L* value greater than 80, more desirably greater than 85 and most desirably greater than 90. The toner image recording layer has a tinge of white that is desirable as neural as possible and has specifically the value $((a^*)^2+(b^*)^2)$ expressed in CIE 1976 (L*a*b*) color space less than 50, more desirably less than 18 and most desirably less than 5.

It is preferred for the toner image recording layer to have a high degree of glossiness, specifically, a degree of 45 degree glossiness higher than 60, more preferably higher than 75, and most preferably higher than 90, over a range of from a white state (which refers to a state where no toner is applied to the toner image recording layer) to a black state (which refers to a state where toner is applied to the image recording layer at the maximum density). However, the highest degree of 45 degree glossiness is preferably less than 110. If the degree of 45 degree glossiness is beyond 110, the toner image recording layer has a metallic luster surface leading to an undesirable image quality. The degree of glossiness can be estimated by the measuring method meeting JIS Z8741.

It is preferred for the toner image recording layer to have a high degree of smoothness, specifically, an arithmetic mean roughness (Ra) less than 3 μm, more preferably less than 1 μm, and most preferably less than 0.5 μm over a range of from the white state to the black state. The arithmetic mean roughness (Ra) can be estimated by the measuring method meeting JIS B0601, B0651 or B0652.

It is further preferred for the toner image recording layer to satisfy at least one, more preferably two or more, and most preferably all, of the following solid state properties (1) to (8):

(1) The toner image recording layer has a melting temperature (Tm) desirably higher than 30° C., but within +20° C. from a melting temperature of toner (2) The toner image recording layer has a temperature at which the toner layer attains viscosity of $1\times10^5$CP higher than 40° C. but lower than that of toner (3) The toner image recording layer has a storage elastic modulus (G') at a fixing temperature in a range of from $1\times10^2$ to $1\times10^5$Pa and a loss elastic modulus (G") at the fixing temperature in a range of from $1\times10^2$ to $1\times10^5$Pa (4) The toner image recording layer has a loss tangent (G"/G') at the fixing temperature, which represents a ration of loss elastic modulus (G") to storage elastic modulus (G'), in a range of from 0.01 to 10

(5) The toner image recording layer has a storage elastic modulus (G') at a fixing temperature is in a range of from −50 Pa from a storage elastic modulus (G't) for toner at fixing temperature to +2500 Pa from the storage elastic modulus (G't)

(6) An angle of inclination of molten toner with respect to the toner image recording layer is less than 50°, and especially less than 40°.

It is preferred that the toner image recording layer satisfies the solid state properties disclosed in, for example, Japanese Patent Publication 2788358, Japanese Unexamined Patent Publication Nos. 7(1995)-248637, 8)1996)-305067 and 10(1998)23889.

It is preferred for the toner image recording layer to have a surface electrical resistivity in a range of from $1\times10^6$ to $1\times10^{15}$ $\Omega/cm^2$ under conditions of a temperature of 25° C. and a relative humidity of 65%. If the lower limit surface electrical resistivity of $1\times10^6$ $\Omega/cm^2$ is exceeded, this indicates that the amount of toner transferred to the toner image recording layer is insufficient, then a toner image is apt to diminish in density. On the other hand, if the upper limit surface electrical resistivity of $1\times10^{15}$ $\Omega/cm^2$ is exceeded, electrostatic charges are generated too much to transfer a sufficient amount of toner to the toner image recording layer. This excessive electrostatic charge generation results in a low density of toner image, adhesion of dust due to electrostatic charges built up during handling the electrophotographic image recording paper, miss-feed of the electrophotographic image recording paper, double feed of two or more electrophotographic image recording paper, generation of charge prints and an occurrence of fractional absence of toner transfer.

The support at the front surface has a surface electrical resistivity preferably in a range of from $5\times10^8$ to $3.2\times10^{10}$ $\Omega/cm^2$ and more preferably in a range of from $1\times10^9$ to $1\times10^{10}$ $\Omega/cm^2$. In this instance, the surface electrical resistivity can be estimated by the method meeting JIS K 6911 using a measuring device such as R8340 manufactured by Advantest Co., Ltd. Specifically, the electrical resistivity is measured under conditions of a temperature of 20° C. and humidity of 65% after a lapse of one minute from impression of a voltage of 100V on a sample after moisturizing the sample for more than 8 hours under the same conditions.

[Other Layers]

As was previously mentioned, the electrophotographic image recording paper may be provided with other layers. Examples of the layer include a surface protective layer, backing layer, an adhesion improvement layer, an intermediate layer, an under coating layer, a cushioning layer, an electrostatic charge adjusting or antistatic layer, a reflection layer, a tinge adjusting layer, a storage stability improvement layer, an antiadhesion layer, an anticurling layer, a smoothing layer, etc. These layers may be provided individually or in any combination of two or more.

The surface protective layer is formed on the surface of the electrophotographic image recording paper for the purpose of protecting the surface thereof, improving storage stability, handling adaptability and pass-though ability to pass though electrophotographic equipments, and providing the electrophotographic image recording paper with writability and antioffset resistance. The surface protective layer may be single-layered or multi-layered. Although various types of thermoplastic resin binder or thermosetting resin binder can be used for the surface protective layer, it is preferred to use the same resin binder as used for the toner image recording layer. The binder of the surface protective layer is not always the same in thermo dynamic and electrostatic characteristics as those of the toner image recording layer and can be optimized so as to meet the surface protective layer.

The surface protective layer may be blended with various additives that are usable for the toner image recording layer, in particular the matting agent as well as the releasing agent described in connection with the electrophotographic image recording paper. It is preferred for the outermost layer of the electrophotoelectric image recording paper (e.g. the surface protective payer when it is formed) to have high compatibility with toner in light of fixing performance. Specifically, it is preferred for the outermost layer to have a contact angle with molten toner in a range of from 0 to 40°.

The backing layer is formed on the back surface of the support opposite to the toner image recording layer for the purpose of providing back surface printing adaptability and improving back surface printing quality, curling balance and pass-though ability to pass though electrophotographic equipments. Though the backing layer is not always bound by color, it is preferred for the backing layer to be white in the case where the electrophotographic image recording paper is of two-sided. The backing layer has a degree of whiteness and a spectral reflecting coefficient both higher than 85% similarly to the toner image recording layer. In order to improve printing adaptability of both surfaces of the electrophotoelectric image recording paper, the backing layer may consist of a single layer or multiple layers and may be the same in structure as that at the toner image recording layer. Further, the backing layer may be blended with additives, in particular, a matting agent and an electrostatic charge adjusting agent, that were previously described. In the case of using a releasing oil for the fixing rollers, the backing layer may be of an oil absorbing type.

The electrophotographic image recording paper is preferably provided with an adhesion improvement layer for the purpose of improving adhesion between the toner image recording layer and the substrate paper. The adhesion improvement layer may be blended with various additives including, in particular a cross-linking agent, that were previously described. Further, it is preferred for the electrophotographic image recording paper to be provided with a cushioning layer between the adhesion improvement layer and the toner image recording layer for the purpose of improving toner acceptability.

The electrophotographic image recording paper may be provided with an intermediate layer between the substrate and the adhesion improvement layer, between the adhesion improvement layer and the cushioning layer, between the cushioning layer and the toner image recording layer, or between the toner image recording layer and the storage stability improvement layer. In the case where the electrophotographic image recording paper consists of the substrate, the toner image recording layer and the intermediate layer, it is of course to put the intermediate layer between the substrate and the toner image recording layer.

[Toner]

In use of the electrophotographic image recording paper for image printing or image copying, toner is applied to the toner image recording layer. The toner contains at least a binder resin, a coloring agent and, if needed, a releasing agent.

-Binder Resin-

Preferred examples of the binder resin include styrene type resins such as styrene and parachlorostyrene; vinyl ester type resins such as vinyl naphthalene, vinyl chloride, vinyl bromide, vinyl fluoride, vinyl acetate, vinyl propionate, vinyl benzoate and vinyl butarate; methylene aliphatic carboxylate ester type resins such as methyl acrylate, ethyl acrylate, n-butyl acrylate, isobutyl acrylate, dodecyl acrylate, n-octyl acrylate, 2-chloroethyl acrylate, phenyl acrylate, methyl α-chloroacrylate, methyl methacrylate, ethyl methacrylate and butyl methacrylate; vinyl nitrile type resins such as acrylonitrile, methacrylonitrile and acrylamide; vinyl ether type resins such as vinyl methyl ether, vinyl ethyl ether and vinyl isobutyl ether; N-vinyl compounds such as N-vinyl pyrrole, N-vinyl carbazole, N-vinyl indole and N-vinyl pyrrolidone; homopolymers or copolymers of vinyl monomers of vinyl carboxylate such as methacrylic acid, acrylic acid and cinnamic acid; and various types of polyester. These binder resin may be used in combination with various wax. It is preferred to use the same type of resin as used for the toner imager recording layer.

-Coloring Agent-

Coloring agents that are used for ordinary toner can be used without any restrictions. Preferred examples of the coloring agent include various pigments, e.g. carbon black, chrome yellow, Hansa yellow, benzidine yellow, slen yellow, quinoline yellow, permanent orange GTR, pyrazolone orange, Vulcan orange, Watchung red, permanent red, brilliant carmine 3B, brilliant carmine 6B, Deipon oil red, pyrazalone red, redole red, rhodamine B lake, lake red C, rose Bengal, aniline blue, ultramarine blue, Carco oil blue, methylene blue chloride, phthalocyanine blue, phthalocyanine green and malachite green oxalate; and various dyes e.g. acridine dyes, xanthene dyes, azoic dyes, benzoquinone dyes, axine dyes, anthraquinone dyes, thioindigo dyes, dioxazine dyes, thiazine dyes, azomethine dyes, indigo dyes, thioindigo dyes, phthalocyanine dyes, aniline black dyes, polymethine dyes, triphenylmethane dyes, diphenylmethane dyes, thiazine dyes, thiazole dyes and xanthene dyes. These pigments or dyes may be used individually or in any combination of two or more.

It is preferred for the toner to contain the coloring agent in a range of from 2 to 8 weight %. The toner does not lose tinting power when containing the coloring agent higher than 2% by mass nor diminish transparency when containing the coloring agent lower than 8% by mass.

-Releasing Agent-

Although all types of wax conventionally known in the art can be used as the releasing agent for the toner in principle, particularly effective examples of the releasing agent include higher crystalline polyethylene wax with a comparatively low molecular weight, Fischer-Tropsch wax, amide wax and polar wax containing nitrogen such as a urethane compound. It is preferred for the polyethylene wax to have a molecular weight less than 1000, and more preferably in a range of from 300 to 1000.

It is preferred to use the compound having an urethane bond because it keeps itself in a solid state due to coagulation power of its polar group even though it has only a small molecular weight and can be set to a higher melting temperature with respect to a low molecular weight It is preferred for the compound to have a molecular weight in a range of from 300 to 1000. Specifically, preferred examples of the raw material for the compound include a combination of a diisocyanate compound and monoalcohol, a combination of monoisocyanate and monoalcohol, a combination of dialcohol and monoisocyanate, a combination of trialcohol and monoisocyanate, a combination of triisocyanate and monoalcohol and the like. In order to keep the compound from having a high molecular weight, it is preferred to combine a compound of multifunctional group and a compound monofunctional group and is important for the compound to have quantitatively equivalent functional groups.

Preferred example of monoisocyanate compound include dodecyl isocyanate, phenyl isocyanate, derivatives of phenyl isocyanate, naphthyl isocyanate, hexyl isocyanate, benzyl isocyanate, butyl isocyanate, aryl isocyanate and the like. Preferred example of diisocyanate compound include tolylene diisocyanate, 4,4' diphenyl methane diisocyanate, toluene diisocyanate, 1, 3-phenylene diisocyanate, hexamethylene diisocyanate, 4-methyl-m-phenylene diisocyanate, isophorone diisocyanate and the like.

Preferred example of monoalcohol include methanol, ethanol, propanol, butanol, pentanol, hexanol, heptanol and other general alcohol. Preferred example of dialcohol include, but not limited to, various glycol such as ethylene glycol, diethylene glycol, triethylene glycol, trimethylene glycol, etc. Preferred example of trialcohol include, but not limited to, trimethylol propane, triethylol propane, trimethanol ethane, etc.

Each of the urethane compounds may be blended with the toner together with a resin and/or a coloring agent like ordinary releasing agents so as to provide a mixed pulvered type of toner. When using the compound for toner in an emulsion polymerization-coagulation melting method, the compound is dispersed in water together with polyelectrolytes such as an ionic surface-active agent, a polymer acid and a polymer base, heated to a temperature higher than its melting temperature and sheared to particulates of less than 1 μm. A dispersion liquid of the releasing particulates can be blended with the toner together with a dispersion liquid of resin particulates and/or a liquid of coloring agent particulates.

-Other Components-

The toner may be blended with other components such as an internal additive, an electrostatic charge control agent, inorganic particulates, etc. Preferred examples of the additive include various magnetic materials: specifically metals such as ferrite, magnetite, reduced iron, cobalt, nickel, manganese, etc.; alloys; and compounds containing these metals.

Preferred examples of the electrostatic charge control agent include dye such as quaternary ammonium salt compounds, nigrosin compounds, a complex of aluminum, iron or chrome; and various triphenylmethane pigments ordinarily used as antistatic agent. In light of controlling ion strength having an effect on stability of the toner during coagulation and melting and reducing wastewater pollution, it is preferred to use an electrostatic charge adjusting agent that is hardly dissolved in water.

Preferred examples of the inorganic particulate include all of the conventional additives that are externally applied to surfaces of toner particles such as silica, alumina, titania, calcium carbonate, magnesium carbonate, tricalcium phosphate, etc. It is preferred to use in the form of a dispersion of the inorganic particulates with an ionic surface-active agent, polymer acid and/or a polymer base.

Surface-active agents can be used for the purpose of emulsion polymerization, seed polymerization, dispersion of pigment, dispersion of resin particles, dispersion of releasing agent, coagulation and stabilization of them. It is effective to use anion surface-active agents such as a sulfate salt surface-active agent, a sulfonate surface-active agent, a phosphate surface-active agent, a soap surface-active agent, etc.; cationic surface-active agents such as an amine salt surface-active agent, a quaternary ammonium salt surface-active agent, etc.; and nonionic surface-active agents such as polyethylene glycol surface-active agent, a surface-active agent of alkylphenol ethylene oxide adduct, polyhydric alcohol surface-active agent, etc. In order to disperse these additives, it is possible to use popular dispersing machines such as a rotary shearing type of homogenizer, a ball mill, a sand mill or the like.

The toner may further contain an external additive if needed. Preferred examples of the additive include inorganic particles such as $SiO_2$ particles, $TiO_2$ particles, $Al_2O_3$ particles, CuO particles, ZnO particles, $SnO_2$ particles, $Fe_2O_3$ particles, MgO particles, BaO particles, CaO particles, $K_2O$ particles, $NaO_2$ particles, $ZiO_2$ particles, $CaO.SiO_2$ particles, $K_2O.(TiO_2)_n$ particles, $Al_2O_3.2SiO_2$ particles, $CaCO_3$ particles, $MgCO_3$ particles, $BaSO_4$ particles or $MgSO_4$ particles; and organic particles such as fatty acid particles, particles of a derivative of fatty acid, metal acids of them, fluorocarbon resin particles, polyethylene resin particles or acryl resins particles. It is preferred for these particles to have an average particle size in a range of from 0.01 to 5 μm, and more preferably in a range of from 0.1 to 2 μm.

Although various methods may be used to manufacture the toner, it is preferred to employ a method comprising the following processes (i) to (iii):

(i) A process of preparing a dispersion liquid of coagulated particles by forming the coagulated particles in a dispersion liquid of resin particles (ii) A process of forming particulate-adhered coagulated particles by mixing a dispersion liquid of particulates to the dispersion liquid of coagulated particles (iii) A process of forming toner particles by heating and melting the particulate-adhered coagulated particles.

-Solid State Properties-

The volumetric average particle size of toner particles is preferably in a range of from 0.5 to 10 μm. If the volumetric average particle size is smaller than 0.5 μm, the toner has adverse effects on its handling (replenishing and cleaning adaptability and flowability) and on particle productivity. On the other hand, if the volumetric average particle size exceeds 10 μm, the toner also has an adverse effect on image quality and resolution due to graininess and transferability.

It is preferred for the toner to have a volumetric average particle size distribution index (GSDv) equal to or less than 1.3 while satisfying the particle size requirement It is further preferred for the toner to have a ratio (GSDv/GSDn) of a volumetric average particle size distribution index (GSDv) relative to a number average particle size distribution index (GSDn) equal to or greater than 0.9. In addition, it is preferred for the toner to have an average of the profile factor expressed by the following equation in a range of from 1.00 to 1.50 while satisfying the volumetric average particle size requirement.

$$\text{Profile factor}=(\pi\times L^2)/(4\times S)$$

where L is the greatest size of toner particle and S is the projected area of toner particle.

When the toner satisfies the requirements as set forth above, the toner has an positive effect on image quality, in particular graininess and resolution of an image, prevents an occurrence of fractional absence of toner transfer and/or an occurrence of blurred toner image, and is hardly apt to have an adverse effect on its handling adaptability even though the average particle size is insufficiently small. In this instance, it is preferred for the toner itself to have a storage elastic modulus (G') (that is measured with an angular frequency of 10 rad/sec) at a temperature of 150° C. in a range of from 10 to 200 Pa in light of improving image quality and preventing an occurrence of offset in the fixing process.

<Silver Salt Photographic Paper>

The silver halide photographic paper comprises, for example, the support of the present invention and at least Y, M and C image forming layers formed on the support. Printing of the silver halide photographic paper is achieved through a silver halide photographic process by passing an exposed silver halide photographic paper through processing baths for color development, bleaching and fixing, washing and drying.

<Ink Jet Recording Paper>

The ink jet printing paper comprises, for example, the support of the present invention and a color ink recording layer formed on the support so as to receive an liquid ink such as an aqueous ink (comprising dye or pigment as a color material) and an oil-based ink or a solid ink that is solid at normal temperature and is liquefied upon printing.

<Thermal Transfer Recording Paper>

The thermal transfer recording paper comprises, for example, the support of the present invention and a hot-melt ink layer as an image forming layer. An image is formed by selectively heating the hot-melt ink layer with a thermal head to transfer ink to the thermal transfer recording paper.

<Heat-Sensitive Recording Paper>

The heat-sensitive recording paper comprises, for example, the support of the present invention and a thermal color development layer. This heat-sensitive recording paper is used with a thermo-autochrome process for forming an image by repeated fixing with heat and ultraviolet radiation with a thermal head.

<Sublimation Transfer Recording Paper>

The sublimation transfer recording paper comprises, for example, the support of the present invention and an ink layer containing at least thermal diffusion dye (sublimation dye). An image is formed by selectively heating the ink layer with a thermal head to transfer the thermal diffusion dye to the sublimation transfer recording paper.

<Printing Paper>

The image recording paper or paper of the present invention is preferably used as a printing paper. In this case, the image recording paper or paper is preferred to have a high mechanical strength in light of applying ink with a printing machine.

When using base paper for the support of these paper, it is preferred that the base paper contains a filler, a softening agent, papermaking dopant substances, etc. Examples of the filler include generally available fillers, i.e. inorganic fillers such as clay, burnt clay, diatom earth, talc, kaolin, burnt kaolin, delimed kaolin, calcium carbonate heavy, precipitated calcium carbonate light, magnesium carbonate, barium carbonate, titanium dioxide, zinc oxide, silicon dioxide, amorphous silica, aluminum hydroxide, calcium hydroxide, magnesium hydroxide, zinc hydroxide, etc.; and organic fillers such as a urea-formalin resin, a polystyrene resin, a phenol resin, a hollow particulate, etc.

Examples of the dopant substance include a yield improver, a freeness improver, a paper strength improver, an internal sizing agent which may be of a nonionic type, a cationic type or an anionic type. More specifically, preferred examples of the dopant substance include compounds of basic aluminum such as aluminum sulfate, aluminum chloride, soda aluminate, basic aluminum chloride, basic polyhydrated aluminum; etc.; compounds of polyvalent metal such as ferrous sulfate, ferric sulfate, etc.; higher polymer compounds such as starch, processed starch, polyacrylamide, urea resins, melamine resins, epoxy resins, polyamide resins, polyamine resins, polyamine, polyethylene imine, vegetable gum, polyvinyl alcohol, latex, polyethylene oxides; disperse materials of hydrophilic cross-linked polymer particles; derivatives of them; denatured products of them; and the like. These materials have two or more functions of dopant substance concurrently. Remarkably effective examples of the sizing agent include alkylketene dimmer compounds, alkenylsuccinic anhydride compounds, styrene-acryl compounds, higher fatty acid compounds, petroleum resins and rosin. The base paper may contain dye, a fluorescent brightening agent, a pH adjuster, a deforming agent, a pitch controller, a slime controller, etc. as dopant substances as appropriate.

The printing paper described above is suitably used particularly for offset lithography and available for relief printing, photogravure printing and electrophotographic printing.

EXAMPLES

The present invention will be further described with respect to, but not limited to, the following examples.

Practical Example 1

Paper pulp for base paper of practical example (PE1) was prepared by beating bleached kraft pulp of a broadleaf tree (LBKP) to a freeness of 300 ml (Canadian Standard Freeness: C.S.F.) so as to adjust pulp fibers in fiber length to 0.6 mm with a disk refiner and then added with 1.2% by mass of cation starch, 0.5% by mass of alkylketene dimmer (AKD), 0.3% by mass of anion polyacrylamide, 0.2% by mass of epoxidized fatty acid amine (EFA) and 0.3% by mass of polyamide polyamine epichlorohydrin. In this instance, the alkyl component of alkylketene dimer (AKD) is derived from fatty acid primarily composed of behenic acid and a fatty acid component of epoxidized fatty acid amine (EFA) is derived from fatty acid primarily composed of behenic acid.

The paper pulp was processed to provide 150 g/m$^2$ by basic weight of base paper with a Fourdrinier paper machine at a rate of 40 m/min by a fixed jet-wire ratio J/W of 0.98. Shaking was performed with a swing of 10 mm. In a later half of the paper making process, a dandy roller with a wire mesh of 25 mesh was used.

The base paper was subjected to surface sizing with a size press machine on the way in a drying zone of the Fourdrinier paper machine so as to apply a coating of polyvinyl alcohol (PVA) (the solid content of 0.5 g/m$^2$) to opposite surfaces of the base paper. Thereafter, in a final stage of the paper making, the base paper was subjected to machine calendering where the base paper was passed through a calender machine with the front face (on which an image recording layer is formed) kept in contact with a metallic calender roller at a surface temperature of 110° C. and the back face kept in contact with a metallic calender roller at a surface temperature of 40° C. under a nip pressure of 150 kN/m (153 kgf/cm). Subsequently, the base paper was further subjected to soft calendering where the base paper was passed through a soft calender machine with the front surface kept in contact with a metallic calender roller at a surface temperature of 210° C. and the back surface kept in contact with a metallic calender roller at a surface temperature of 40° C. under a nip pressure of 210 kN/m (214 kgf/cm).

Measurements were made to determine attributions of the base paper, i.e. a formation index, a change of freeness index, density and a change of density. The result is shown together with freeness and fiber length in Table I.

-Formation Index-

In this instance, the formation index was measured by 3-D Sheet Analyzer manufactured by M/K Systems Corporation under the following conditions and was represented by an average formation index of three pieces of the base paper.

| | |
|---|---|
| Measuring range: | 10 cm × 10 cm |
| Measuring points: | 65536 points |
| Restriction diameter: | 1.0 mm |

-Change of Formation Index-

The change of formation index was measured as a difference between formation indices before and after contact of the front face of the base paper with water at 20° C. for 30 seconds.

Density-

The density was measured in terms of a base weight relative to thickness and represented by an average density of three pieces of the base paper.

-Change of Density-

The change of density was measured as a difference between density before and after contact of the front face of the base paper with water at 20° C. for 30 seconds.

Practical Examples 2~5 and Comparative Examples 1~4

Base paper of practical examples 2~5 (PE2~PE5) and comparative examples 1~4(CE1~CE4) were prepared in the same way as the base paper of practical example 1 (PE1) except freeness, fiber length and processing conditions as shown in Tables I and II. The same measurements were made as to the respective examples PE2~PE5 and CE1~CE4 and the results are shown in Table I.

TABLE I

| | Freeness (C.S.F.) (ml) | Fiber length Mm | Density $g/m^3$ | Density change $g/m^3$ | Formation index | Formation index change |
|---|---|---|---|---|---|---|
| PE1 | 300 | 0.58 | 1.03 | 0.02 | 120 | 3 |
| PE2 | 280 | 0.54 | 1.06 | 0.04 | 132 | 6 |
| PE3 | 300 | 0.58 | 1.01 | 0.05 | 102 | 8 |
| PE4 | 260 | 0.56 | 1.02 | 0.07 | 95 | 11 |
| PE5 | 300 | 0.63 | 0.97 | 0.03 | 83 | 6 |
| CE1 | 410 | 0.74 | 0.96 | 0.07 | 53 | 11 |
| CE2 | 300 | 0.58 | 0.91 | 0.05 | 71 | 7 |
| CE3 | 360 | 0.66 | 0.86 | 0.02 | 39 | 2 |
| CE4 | 440 | 0.69 | 0.84 | 0.03 | 32 | 2 |

TABLE II

| | J/W | Shake | Dandy roller | Soft calendering temperature (° C.) |
|---|---|---|---|---|
| PE1 | 0.98 | Used | Used | 210 |
| PE2 | 0.98 | Used | Used | 250 |
| PE3 | 0.98 | Used | Not used | 180 |
| PE4 | 0.98 | Used | Not used | 140 |
| PE5 | 0.98 | Not used | Not used | 160 |
| CE1 | 0.98 | Not used | Not used | 100 |
| CE2 | 0.98 | Not used | Not used | 100 |
| CE3 | 0.98 | Not used | Not used | 90 |
| CE4 | 0.98 | Not used | Not used | 90 |

Practical Examples 6~10 and Comparative Examples 5~8

Electrophotographic image recording paper of practical examples 6~10 (PE6~PE10) and comparative examples 5~8 (CE5~CE8) were prepared by the use of the base paper of practical examples 1~5 (PE1~PE5) and comparative examples 1~4 (CE1~CE4), respectively, in the following manner.

-Titanium Dioxide Dispersion Liquid-

A titanium dioxide dispersion liquid was prepared by dispersing a mixture of 40.0 g of titanium dioxide (Taipek RA-220: Ishiharasangyo Ltd.), 20 g of polyvinyl alcohol (PVA102: Kurare Co., Ltd.) and 58.0 g of ion exchanged water with NBK-2 (Nihon Seiki Co., Ltd.) so as to contain 40% by mass of titanium dioxide pigment.

-Coating Liquid of Toner Image Recording Layer-

A coating liquid of toner image recording layer was prepared by making and sting a mixture of 15.5 g of the titanium dioxide dispersion liquid with 15.0 g of carnauba wax dispersion liquid (Serzole 524: Chukyo Oils & Fats Co., Ltd.), 100 g of polyester resin water dispersion (solid content: 30% by mass) (KZA-7049: Unitika Ltd.), 2.0 g of viscosity fortifier (Alcox E30: Meisei Chemical Co., Ltd.), 0.5 g of anion surface active agent (AOT) and 80 ml of ion exchanged water so as to have viscosity of 40 mPa·s and surface tension of 34 mN/m.

-Coating Liquid of Backing Layer-

A coating liquid of backing layer was prepared by making and stirring a mixture of 100 g of acrylic resin water dispersion (solid part: 30% by mass) (Hyros XBH-997L: Seiko Chemical Industry Co., Ltd.), 5.0 g of a matting agent (Tekpomar MBX-12: Sekisui Chemical Co., Ltd.), 10.0 g of a releasing agent (Hidrin D-337: Chukyo Oils & Fats Co.), 2.0 g of a viscosity improver (CMC), 0.5 g of an anion surface active agent (AOT) and 80 ml of ion exchanged water so as to have viscosity of 35 mPa·s and surface tension of 33 mN/m.

<Coating Toner Image Recording Layer and Backing Layer>

Each of the base paper of practical examples PE1~PE5 and comparative examples CE1~CE4 was coated with a backing layer on the back surface with a bar coater so that the backing layer has a dried mass of 9 $g/m^2$ and then with a toner image recording layer on the front surface with a bar coater so that the image recording layer had a dried mass of 12 $g/m^2$. The toner imager recording layer contained 5% by mass of pigment with respect to the thermoplastic resin.

These toner image recording layer and backing layer were subjected to on-line hot-air drying. The hot-air flow rate and temperature were adjusted so as to complete the drying of each layer within a period of two minutes after the application of coating. The drying temperature was set to a point at which the surface temperature of the coated layer becomes equal to the wet-bulb temperature of the hot-air. After drying, the base paper was further subjected to calendering with a gloss calender with a metallic roller kept at a surface temperature of 40° C. under a nip pressure of 14.7 kN/m (15 kgf/cm).

An image was printed on A4 size of sheets cut off from the electrophotographic image recording paper of the respective examples with a laser color printer, DocuColor 125-PF (tradename of Fuji Xerox Co., Ltd) equipped with a belt fixing device 1 shown in the drawing. As shown in the single figure, the belt fixing device 1 comprises a fixing belt 2 mounted between a heating roller 3 and a tension roller 5 and a cooling device 7 disposed between the heating roller 3 and the tension roller 5. The belt fixing device 1 further comprises a pressure roller 4 disposed adjacent to the heating roller 3 so as to press the fixing belt 2 against the heating roller 3 and a cleaning roller 6 disposed adjacent to the tension roller 5 so as to keep in contact with the fixing belt 2. The electrophotographic image recording paper with a latent toner image formed thereon is fed into a nip between the heating roller 3 and the pressure roller 4 and moved by means of the fixing belt 2. During movement, the electrophotographic image recording paper is cooled by the cooling device 7 and cleaned by the cleaning roller 6.

The belt fixing device 1 was operated with at a belt speed of 30 mm/sec, a nip pressure of 0.2 MPa (2 kgf/m2) between the heating roller 3 and the pressure roller 4, and a fixing temperature of 150° C. that was provided by the heating roller 3 kept at 150° C. and the pressure roller 4 kept at 120° C.

Qualitative assessments were made concerning image quality and glossiness of the electrophotographic prints made by the electrophotographic printer described above. The result is shown in Table III.

The electrophotographic prints were visually examined for comparative assessment of image quality and glossiness in five grades, namely from A to D defined as below.

TABLE III

| | Base paper | Glossiness | Image quality |
|---|---|---|---|
| PE6 | PE1 | A | A |
| PE7 | PE2 | A | A |
| PE8 | PE3 | B | A |
| PE9 | PE4 | B | B |
| PE10 | PE5 | B | B |
| CE5 | CE1 | B | D |
| CE6 | CE2 | C | C |
| CE7 | CE3 | D | D |
| CE8 | CE4 | E | E |

A: Very excellent (acceptable as a high qulality image recording paper)
B: Excellent (acceptable as a high quality image recording paper)
C: Average (unacceptable as a high quality image recording paper)
D: Poor (unacceptable as a high quality image recording paper)
E: Very poor (unacceptable as a high quality image recording paper)

It is manifested by Table III that the electrophotographic image recording paper of examples PE6~PE10 using the support made of the base paper of practical examples PE1~PE5, respectively, are superior in image quality and glossiness to the electrophotographic image recording paper of comparative examples CE5~CE8 using the support made of the base paper of examples CE1~CE4, respectively.

Practical Examples 11~15 and Comparative Examples 9~12

Electrophotographic image recording paper of practical examples 11~15 (PE11~PE15) and comparative examples 9~12 (CE9~CE12) were prepared by the use of base paper of practical examples 1~5 (PE1~PE5) and comparative examples 1~4 (CE1~CE4), respectively, in the following manner.

A support was prepared by applying a coating layer of an aqueous polymer liquid prepared by mixing 40 solid part of acryl emulsion (glass transition temperature (Tg)=60° C., 10 solid parts of wax emulsion, 40 solid part of $CaCO_3$, 10 solid parts of oxidized starch and an appropriate amount of water to the front surface of the base paper of each example (PE1~PE5, CE1~CE4) with a gate roller coater so as to have 4 $g/m^2$ by solid content of aqueous polymer.

The electrophotographic image recording paper practical examples PE1~PE15 and comparative examples CE9~CE12 were made by the use of the aqueous polymer coated support made of the base paper of examples PE1~PE5 and CE1~CE4, respectively. Except the use of the aqueous polymer coated support, the electrophotographic image recording paper practical examples PE11~PE15 and comparative examples CE9~CE12 were the same as those of examples PE6~PE10 and CE5~CE8.

The electrophotographic prints of examples PE11~PE15 and CE9~CE12 were examined for comparative assessment of image quality and glossiness in the same manner as the electrophotographic prints of examples PE6~PE10 and CE5~CE8. The result is shown in Table IV.

TABLE IV

| | Base paper | Glossiness | Image quality |
|---|---|---|---|
| PE11 | PE1 | A | A |
| PE12 | PE2 | A | A |
| PE13 | PE3 | A | A |
| PE14 | PE4 | A | A |
| PE15 | PE5 | A | B |
| CE9 | CE1 | B | C |
| CE10 | CE2 | C | C |

TABLE IV-continued

| | Base paper | Glossiness | Image quality |
|---|---|---|---|
| CE11 | CE3 | C | D |
| CE12 | CE4 | C | E |

Practical Examples 16~20 and Comparative Examples 13~16

Photographic printing paper of practical examples 16~20 (PE16~PE20) and comparative examples 13~16 (CE13~CE16) were prepared by the use of the base paper of practical examples 1~5 (PE1~PE5) and comparative examples 1~4 (CE1~CE4), respectively, in the following manner.

A support for each photographic printing paper was prepared by applying a layer of lower density polyethylene (LDPE) containing 10% by mass of $TiO_2$ to the front surface of the base paper by extrusion coating so that the polyethylene layer has a thickness of 25 μm and a layer of polyethylene mixture having a mixture ratio by mass of higher density polyethylene and lower density polyethylene (HDPE/LDPE) of 1 to the back surface of the base paper by extrusion coating so that the polyethylene layer has a thickness of 20 μm. After applying corona discharge treatment to the frond surface of the double-sided polyethylene coated support, 0.1 $g/m^2$ of gelatin was coated to the front surface of the double-sided polyethylene coated support, thereby prepared the support for photographic printing paper.

The support was coated, in order from the bottom to the top, with 10 $g/m^2$ of yellow developing silver halide gelatin emulsion layer, an intermediate gelatin layer, 10 $g/m^2$ of magenta developing silver halide gelatin emulsion layer, an intermediate gelatin layer, 10 $g/m^2$ of cyan developing silver halide gelatin emulsion layer and a protective gelatin layer on the gelatin coated front surface thereof The photographic printing paper of examples PE16~PE20 and CE13~CE16 were prepared by the use of the support made of the base paper of examples PE1~PE5 and CE1~CE4, respectively, in that manner were exposed and processed so as thereby to provide prints.

The photographic prints of examples PE16~PE20 and CE13~CE16 were examined for comparative assessment of printed surface smoothness (micro-concavity and micro-convexity less than 1 mm) and printed surface evenness (concave and convex undulation less than 5~6 mm) in five grades, namely from A for surface smoothness, i.e. micro-concavity or micro-convexity, less than 1 mm and surface evenness, i.e. concave or convex undulation, less than 5~6 mm to D defined as below. The result is shown in Table V

TABLE V

| | Base paper | Smoothness | Evenness |
|---|---|---|---|
| PE16 | PE1 | A | A |
| PE17 | PE2 | A | A |
| PE18 | PE3 | B | A |
| PE19 | PE4 | B | A |
| PE20 | PE5 | B | B |
| CE13 | CE1 | B | D |
| CE14 | CE2 | C | C |

TABLE V-continued

| | Base paper | Smoothness | Evenness |
|---|---|---|---|
| CE15 | CE3 | D | D |
| CE16 | CE4 | E | E |

A: Very excellent (acceptable as a high quality image recording paper)
B: Excellent (acceptable as a high quality image recording paper)
C: Average (unacceptable as a high quality image recording paper)
D: Poor (unacceptable as a high quality image recording paper)
E: Very poor (unacceptable as a high quality image recording paper)

It is manifested by Table V that the photographic printing paper of examples PE16~PE20 using the support made of the base paper of practical examples PE1~PE5, respectively, are superior in both surface smoothness and surface evenness to the photographic printing paper CE13~CE 16 using the support made of the base paper of comparative examples of examples CE1~CE4, respectively.

What is claimed is:

1. A support for an image recording material comprising base paper having a formation index at a restriction diameter of 1.0 mm equal to or greater than 80, wherein a change of said formation index of said base paper before and after contact of a front surface of said base paper at a side on which an image recording layer of said image recording material is formed with water at 20° C. for 30 seconds is equal to or less than 10.

2. A support for an image recording material comprising base paper having a formation index at a restriction diameter of 1.0 mm equal to or greater than 80, wherein said base paper has density equal to or greater than 0.95 $g/m^3$, and wherein a change of said density of said base paper before and after contact of said front surface of said base paper with water at 20° C. for 30 seconds is equal to or less than 0.05 $g/m^3$.

3. A support for an image recording material as defined in claim 1, wherein said base paper is made with a paper machine equipped with a shake having a swing of 10 mm or greater.

4. A support for an image recording material as defined in claim 1, wherein said base paper is made with a paper machine equipped with a dandy roller having a wire in a range of from 40 to 100 mesh.

5. A support for an image recording material as defined in claim 1, wherein said base paper is made of paper pulp having a weight-average fiber length in a range of from 0.45 to 0.65 nm with a paper machine equipped with a calender having a metal roller at a surface temperature of 140° C. or higher.

6. A support for an image recording material as defined in claim 1, wherein said base paper is coated with at least one of a water repellent agent, a sizing agent, a water-proofing agent and a finishing agent at said front surface.

7. A support for an image recording material as defined in claim 1, wherein said base paper is impregnated with at least one of a water repellent agent, a sizing agent, a water-proofing agent and a finishing agent at said front surface.

8. A support for an image recording material as defined in claim 1, wherein said base paper is coated with an aqueous polymer contained layer at least one of opposite surfaces thereof.

9. A support for an image recording material as defined in claim 1, wherein said base paper is coated with a polyolefin resin layer at least one of opposite surfaces thereof.

10. An image recording material comprising:

a support comprising base paper having a formation index at a restriction diameter of 1.0 mm equal to or greater than 80; and an image forming layer formed on said support;

wherein a change of said formation index of said base paper before and after contact of a front surface of said base paper at a side on which an image recording layer of said image recording material is formed with water at 20° C. for 30 seconds is equal to or less than 10.

11. An image recording material comprising:

a support comprising base paper having a formation index at a restriction diameter of 1.0 mm equal to or greater than 80; and an image forming layer formed on said support;

wherein said base paper has density equal to or greater than 0.95 $g/m^3$;

wherein a change of said density of said base paper before and after contact of said front surface of said base paper with water at 20° C. for 30 seconds is equal to or less than 0.05 $g/m^3$.

12. An image recording material as defined in claim 10, wherein said base paper is made with a paper machine equipped with a shake having a swing of 10 mm or greater.

13. An image recording material as defined in claim 10, wherein said base paper is made with a paper machine equipped with a dandy roller having a wire in a range of from 40 to 100 mesh.

14. An image recording material as defined in claim 10, wherein said base paper is made of paper pulp having a weight-average fiber length in a range of from 0.45 to 0.65 nm with a paper machine equipped with a calender having a metal roller at a surface temperature of 140° C. or higher.

15. An image recording material as defined in claim 10, wherein said base paper is coated with at least one of a water repellent agent, a sizing agent, a water-proofing agent and a finishing agent at said front surface.

16. An image recording material as defined in claim 10, wherein said base paper is impregnated with at least one of a water repellent agent, a sizing agent, a water-proofing agent and a finishing agent at said front surface.

17. An image recording material as defined in claim 10, wherein said base paper is coated with an aqueous polymer contained layer at least one of opposite surfaces thereof.

18. An image recording material as defined in claim 10, wherein said base paper is coated with a polyolefin resin layer at least one of opposite surfaces thereof.

19. A support for an image recording material as defined in claim 2, wherein said base paper is coated with at least one of a water repellent agent, a sizing agent, a water-proofing agent and a finishing agent at said front surface.

20. A support for an image recording material as defined in claim 2, wherein said base paper is impregnated with at least one of a water repellent agent, a sizing agent, a water-proofing agent and a finishing agent at said front surface.

21. A support for an image recording material as defined in claim 2, wherein said base paper is coated with an aqueous polymer contained layer at least one of opposite surfaces thereof.

22. A support for an image recording material as defined in claim 2, wherein said base paper is coated with a polyolefin resin layer at least one of opposite surfaces thereof.

23. An image recording material as defined in claim 11, wherein said base paper is coated with at least one of a water repellent agent, a sizing agent, a water-proofing agent and a finishing agent at said front surface.

24. An image recording material as defined in claim 11, wherein said base paper is impregnated with at least one of a water repellent agent, a sizing agent, a water-proofing agent and a finishing agent at said front surface.

* * * * *